US008386776B2

(12) United States Patent
Gomi et al.

(10) Patent No.: US 8,386,776 B2
(45) Date of Patent: Feb. 26, 2013

(54) CERTIFICATE GENERATING/DISTRIBUTING SYSTEM, CERTIFICATE GENERATING/DISTRIBUTING METHOD AND CERTIFICATE GENERATING/DISTRIBUTING PROGRAM

(75) Inventors: Hidehito Gomi, Tokyo (JP); Makoto Hatakeyama, Tokyo (JP)

(73) Assignee: NEC Corporation, Tokyo (JP)

( * ) Notice: Subject to any disclaimer, the term of this patent is extended or adjusted under 35 U.S.C. 154(b) by 422 days.

(21) Appl. No.: 12/733,543

(22) PCT Filed: Sep. 17, 2008

(86) PCT No.: PCT/JP2008/066715
§ 371 (c)(1),
(2), (4) Date: Mar. 8, 2010

(87) PCT Pub. No.: WO2009/041319
PCT Pub. Date: Apr. 2, 2009

(65) Prior Publication Data
US 2011/0004753 A1    Jan. 6, 2011

(30) Foreign Application Priority Data
Sep. 25, 2007 (JP) ................................. 2007-247597

(51) Int. Cl.
*H04L 29/06* (2006.01)

(52) U.S. Cl. .......................... 713/156; 713/170; 713/175

(58) Field of Classification Search .......... 713/156–158, 713/170, 175
See application file for complete search history.

(56) References Cited

U.S. PATENT DOCUMENTS

| 7,221,935 | B2 | 5/2007 | Barriga-Caceres et al. |
| 7,296,290 | B2 | 11/2007 | Barriga-Caceres et al. |
| 2004/0128392 | A1* | 7/2004 | Blakley et al. ................ 709/229 |
| 2005/0021964 | A1* | 1/2005 | Bhatnagar et al. ............ 713/175 |
| 2006/0021017 | A1* | 1/2006 | Hinton et al. .................. 726/10 |
| 2006/0021018 | A1 | 1/2006 | Hinton et al. |
| 2006/0129817 | A1* | 6/2006 | Borneman et al. ............ 713/170 |

FOREIGN PATENT DOCUMENTS

| JP | 2005-175992 A | 6/2005 |
| JP | 2005-519365 A | 6/2005 |
| JP | 2006-252418 A | 9/2006 |

(Continued)

OTHER PUBLICATIONS

OASIS, Assertions and Protocols for the OASIS Security Assertion Markup Language (SAML) V2.0, Internet<URL: http://docs.oasis-open.org/security/sam1/v2.0/saml-core-2.0-os.pdf>, Mar. 15, 2005, 86 pages.

*Primary Examiner* — Benjamin Lanier
(74) *Attorney, Agent, or Firm* — Foley & Lardner LLP

(57) ABSTRACT

In a certificate generating/distributing system, an authentication apparatus includes token transmitting means transmitting, to a service mediating apparatus, a certificate generation request token, which is information corresponding to a first certificate valid in the service mediating apparatus, together with the first certificate. The service mediating apparatus includes mediating apparatus token forwarding means forwarding the certificate generation request token to a service providing apparatus. The service providing apparatus includes certificate requesting means transmitting the certificate generation request token to the authentication apparatus when requesting a second certificate valid in the service providing apparatus. The authentication apparatus includes certificate transmitting means transmitting, to the service providing apparatus, the second certificate generated based on the first certificate in response to the request of the second certificate by the certificate requesting means.

15 Claims, 27 Drawing Sheets

FOREIGN PATENT DOCUMENTS

| | | |
|---|---|---|
| JP | 2007-149010 A | 6/2007 |
| JP | 2007-233705 A | 9/2007 |
| WO | WO 2004/059415 A2 | 7/2004 |
| WO | WO 2004/059478 A2 | 7/2004 |

* cited by examiner

| apparatus name | account name (anonym) | domain |
|---|---|---|
| authentication apparatus 200 | Alice200 | authn200.com |
| service mediating apparatus 201 | aabbcc | sp-proxy201.com |
| service providing apparatus 202 | xxyyzz | sp202.com |

Fig.29

```
<Assertion ID="assertion-12345678910" IssueInstant="2005-07-01T00:20:02Z" Version="2.0">
  <Issuer> https://authn200.com </Issuer>
  <ds:Signature> signature by authn200 goes here </ds:Signature>
  <Subject>
    <NameID Format="urn:oasis:names:tc:SAML:1.1:nameid-format:persistent>
      aabbcc
    </NameID>
  </Subject>
  <Conditions NotBefore="2005-07-01T00:20:02Z" NotOnOrAfter="2005-07-01T00:25:02Z">
    <AudienceRestriction>
      <Audience>http://sp-proxy201.com</Audience>
    </AudienceRestriction>
  </Conditions>
  <AuthnStatement AuthnInstant="2005-07-01T00:20:02Z" NotONOrAfter="2005-07-01T00:25:02Z">
    <saml:AuthnContext>
      <saml:AuthnContextClassRef>
        urn:oasis:names:tc:SAML:2.0:ac:classes:PasswordProtectedTransport
      </saml:AuthnContextClassRef>
    </saml:AuthnContext>
  </AuthnStatement>
</Assertion>
```

Fig.30

```
HTTP1.1 200 OK
Content-Type: text/xml
Content-Length: 13455
<soap-env:Envelope>
  <soap-env:Header>
    <cert-req-token>
      9df234tr5234rig3485289
    </cert-req-token>
  </soap-env:Header>
  <soap-env:Body>
    <samlp:Response>
      <saml:Issuer> https://authn200.com </saml:Issuer>
      <ds:Signature> ......... </ds:Signature>
      <Status>
        <StatusCode Value="urn:oasis:names:tc:SAML:2.0:status:Success"/>
      </Status>
      <Assertion ID="assertion-12345678910" IssueInstant="2005-07-01T00:20:02Z" Version="2.0">
        <Issuer> https://authn200.com</Issuer>
        <ds:Signature> signature by authn200 goes here </ds:Signature>
        <Subject>
          <NameID Format="urn:oasis:names:tc:SAML:1.1:nameid-format:persistent>
            aabbcc
          </NameID>
        </Subject>
        ...
      </Assertion>
    </samlp:Response>
  </soap-env:Body>
</soap-env:Envelope>
```

Fig. 31

| certificate generation request token | certificate identifier | user identifier |
|---|---|---|
| 9df234tr5234rig3485289 | assertion-12345678910 | Alice200 |
|  |  |  |
|  |  |  |

Fig. 32

```
<Assertion ID="assertion-789012255" IssueInstant="2005-07-01T00:23:02Z" Version="2.0">
  <Issuer> https://authn200.com </Issuer>
  <ds:Signature> signature by authn200 goes here </ds:Signature>
  <Subject>
    <NameID Format="urn:oasis:names:tc:SAML:1.1:nameid-format:persistent>
      xxyyzz
    </NameID>
  </Subject>
  <Conditions NotBefore="2005-07-01T00:20:02Z" NotOnOrAfter="2005-07-01T00:20:02Z">
    <AudienceRestriction>
      <Audience>http://sp202.com</Audience>
    </AudienceRestriction>
  </Conditions>
  <AuthnStatement AuthnInstant="2005-07-01T00:20:02Z" NotONOrAfter="2005-07-01T00:25:02Z">
    <saml:AuthnContext>
      <saml:AuthnContextClassRef>
        urn:oasis:names:tc:SAML:2.0:ac:classes:PasswordProtectedTransport
      </saml:AuthnContextClassRef>
    </saml:AuthnContext>
  </AuthnStatement>
</Assertion>
```

Fig. 33

```
POST /rent-car-service HTTP/1.1
HOST: sp-proxy201.com
Content-Type: text/xml
Content-Length: 555
<soap-env:Envelope>
  <soap-env:Header>
    <cert-req-token>
      9df234tr5234rig3485289
    </cert-req-token>
  </soap-env:Header>
  <soap-env:Body>
    <rent-a-car-req>
      <date> 2007-06-25 </date>
      <car-type> medium </car-type>
      ...
    </rent-a-car-req>
  </soap-env:Body>
</soap-env:Envelope>
```

```
POST /cert-generating-service HTTP/1.1
HOST: sp202.com
Content-Type: text/xml
Content-Length: 444
<soap-env:Envelope>
 <soap-env:Header>
   <cert-req-token>
      9df234tr5234rig3485289
   </cert-req-token>
 </soap-env:Header>
 <soap-env:Body>
   <cert-generation-req>
     <cert-type> authentication </cert-type>
     ...
   </cert-generation-req>
 </soap-env:Body>
</soap-env:Envelope>
```

Fig.36

```
POST /cert-generating-service HTTP/1.1
HOST: sp204.com
Content-Type: text/xml
Content-Length: 777
<soap-env:Envelope>
  <soap-env:Header>
    <cert-req-token>
        sdfasdfasjkdfa90323
    </cert-req-token>
  </soap-env:Header>
  <soap-env:Body>
    <cert-generation-req>
      <cert-type> attributes </cert-type>
      <req-attributes>
        <zip-code/>
        <age/>
        <rate-for-payment/>
      </req-attributes>
    </cert-generation-req>
  </soap-env:Body>
</soap-env:Envelope>
```

Fig.37

```
<Assertion ID="assertion-789012255" IssueInstant="2005-07-01T00:30:02Z" Version="2.0">
  <Issuer> https://authn200.com </Issuer>
  <ds:Signature> signature by authn200 goes here </ds:Signature>
  <Conditions NotBefore="2005-07-01T00:50:02Z" NotOnOrAfter="2005-07-01T00:50:02Z">
    <AudienceRestriction>
      <Audience>http://sp204.com</Audience>
    </AudienceRestriction>
  </Conditions>
  <AttributeStatement>
    <saml:Attribute Name="zip-code">
      <saml:AttributeValue xsi:type="xs:string"> 211-8666 </saml:AttributeValue>
    </saml:Attribute>
    <saml:Attribute Name="age">
      <saml:AttributeValue xsi:type="xs:string"> 40 </saml:AttributeValue>
    </saml:Attribute>
    <saml:Attribute Name="rate-for-payment">
      <saml:AttributeValue xsi:type="xs:string"> AAA </saml:AttributeValue>
    </saml:Attribute>
  </AttributeStatement>
</Assertion>
```

Fig.40

| apparatus name | account name (anonym) | domain |
|---|---|---|
| authentication apparatus 200 | Alice200 | authn200.com |
| service mediating apparatus 201 | aabbcc | sp-proxy201.com |
| service providing apparatus 601 | xxyyzz | sp202.com |
| service providing apparatus 600 | qwerty | sp600. insurance. com |

CERTIFICATE GENERATING/DISTRIBUTING SYSTEM, CERTIFICATE GENERATING/DISTRIBUTING METHOD AND CERTIFICATE GENERATING/DISTRIBUTING PROGRAM

This application is the National Phase of PCT/JP2008/066715, filed Sep. 17, 2008, which claims priority to Japanese Application No. 2007-247597, filed Sep. 25, 2007, the disclosures of which are hereby incorporated by reference in their entirety.

TECHNICAL FIELD

The present invention relates to a certificate generating/distributing system, certificate generating/distributing method and certificate generating/distributing program, and more particularly, to a certificate generating/distributing system, certificate generating/distributing method and certificate generating/distributing program capable of dynamically and efficiently generating and distributing a certificate. Furthermore, the present invention relates to an authentication apparatus, service mediating apparatus and service providing apparatus provided for the certificate generating/distributing system. Furthermore, the present invention relates to a service mediating apparatus certificate generating/distributing program and service providing apparatus certificate generating/distributing program.

BACKGROUND ART

In recent years, there are a growing number of distributed systems that release various services via a network. Accordingly, authentication and approval of users who access such services via the network are becoming an important task to service providers on the network. When it is preferred that access to those services be granted to only a limited number of predetermined users, certificates describing authentication results or the like regarding users are often distributed to the service systems provided by the service providers to allow the users to access the services.

As the above described technique, there is a standard technique specification SAML (Security Assertion Markup Language) defined by a standardization organization OASIS for linking authentication information regarding users among providers on a network. An example of a certificate generating/distributing system using the SAML is described in Non-Patent Document 1. FIG. 1 illustrates an example of the certificate generating/distributing system described in Non-Patent Document 1. FIG. 2 illustrates an example where the certificate generating/distributing system described in Non-Patent Document 1 is applied to perform proxy access processing.

The certificate generating/distributing system described in Non-Patent Document 1 is provided with IdP (identity provider) 100, SP (service provider) 101 and user agent (software of user terminal) 102. IdP 100, SP 101 and user agent 102 are connected to each other via a network such as the Internet.

As a typical operation of the certificate generating/distributing system described in Non-Patent Document 1 having such a configuration, a procedure will be described below, which is carried out between the IdP and SP when a single sign-on is achieved through creation and distribution of an authentication certificate using an artifact profile of a Web SSO protocol.

In the example shown in FIG. 1, each user is presupposed to possess accounts for user information 103 of IdP 100 and user information 104 of SP 101 respectively. Furthermore, both accounts are linked together beforehand. That is, both accounts are stored in relation to each other. For example, when IdP 100 authenticates a user, IdP 100 transmits authentication result information to SP 101. SP 101 judges based on the received authentication result information that the user has been authenticated and provides a service (single sign-on).

As shown in FIG. 1, the user receives the authentication of IdP 100 using user agent 102 and makes a login (step S1). The user (user agent 102) then accesses SP 101 to use a service provided by SP 101 (step S2) that provides for restricted access.

SP 101 sends an authentication request message to user agent 102 for authentication of the user (step S3-*a*) and user agent 102 redirects (forwards) the authentication request message from SP 101 to IdP 100 (step S3-*b*). IdP 100 confirms that the user has already been authenticated in step S1 and creates an authentication certificate (authentication assertion) written in XML that certificates that the user has already been authenticated (step S4).

Furthermore, IdP 100 creates an artifact that plays the role of a ticket corresponding to an authentication assertion and sends the ticket back to user agent 102 (step S5-*a*). User agent 102 redirects the artifact to SP 101 (step S5-*b*). SP 101 receives the artifact, sends the artifact to IdP 100 and requests the corresponding authentication assertion (step S6). IdP 100 checks the artifact received from SP 101 and sends the corresponding authentication assertion back to SP 101 (step S7). SP 101 checks the authenticity of the authentication assertion received from IdP 100 and verifies whether or not to accept the user request for access to the service using a security policy of SP 101. When the request is accepted, SP 101 starts to provide the service to user agent 102 (step S8).

As described so far, IdP 100 creates a certificate regarding the user and distributes the certificate to SP 101. Here, as described above, the certificate distributed by IdP 100 can describe anonym information that is valid only between IdP 100 and SP 101 as information relating to the user accounts in IdP 100 and SP 101 respectively, information on the valid range (target provider validated through the distribution) of the certificate and other confidential information regarding the user or the like. That is, the certificate distributed by IdP 100 is provided with a function of preventing security information from being leaked to anybody other than the predetermined target. Non-Patent Document 1 is the document shown below.

Non-Patent Document 1: Author: OASIS, title: "Assertions and Protocol for the OASIS Security Assertion Markup Language (SAML) V2.0", medium type: online, date of posting: Mar. 15, 2005, date of search: May 30, 2007, information source: Internet <URL: http://docs.oasis-open.org/security/saml/v2.0/saml-core-2.0-os.pdf>

DISCLOSURE OF INVENTION

Regarding a user who has been authenticated by an IdP and accesses a service of a first SP, when the first SP attempts proxy access for the user to a second SP, which is different from the first SP, the second SP requests distribution of a certificate regarding the user from the IdP. In this case, the certificate generating/distributing system described in Non-Patent Document 1 has a problem in which communication that is necessary to create and distribute the certificate becomes inefficient.

The reason is that according to the scheme described in Non-Patent Document 1, when there is no means for exchanging user information on the user or certificate information between the SPs (between the first SP and second SP) and when the first SP is not provided with the function as the user agent, the second SP needs to request and distribute the certificate via the user agent. That is, although the first SP has already performed authentication processing (steps S3-$a$ to S7) via user agent 102, the second SP needs to perform the same processing (steps S3-$a$ to S7) via the first SP and user agent 102, which results in a problem in which the communication between the second SP and IdP becomes inefficient.

It is an object of the present invention to provide a certificate generating/distributing system, authentication apparatus, service mediating apparatus, service providing apparatus, certificate generating/distributing method, certificate generating/distributing program, service mediating apparatus certificate generating/distributing program and service providing apparatus certificate generating/distributing program that solve the aforementioned problems.

A certificate generating/distributing system according to the present invention is a certificate generating/distributing system provided with an authentication apparatus that authenticates a user, a service providing apparatus that provides a service and a service mediating apparatus that mediates service provision by the service providing apparatus, wherein the authentication apparatus comprises token transmitting means transmitting, to the service mediating apparatus, a certificate generation request token, which is information corresponding to a first certificate valid in the service mediating apparatus, together with the first certificate, the service mediating apparatus comprises mediating apparatus token forwarding means forwarding the certificate generation request token received from the token transmitting means to the service providing apparatus, the service providing apparatus comprises certificate requesting means transmitting the certificate generation request token received from the mediating apparatus token forwarding means to the authentication apparatus when requesting a second certificate valid in the service providing apparatus, and the authentication apparatus comprises certificate transmitting means transmitting the second certificate generated based on the first certificate corresponding to the received certificate generation request token to the service providing apparatus in response to a request of the second certificate by the certificate requesting means.

An authentication apparatus according to the present invention is an authentication apparatus that authenticates a user, the authentication includes token transmitting means transmitting, to a service mediating apparatus, a certificate generation request token, which is information corresponding to a first certificate valid in the service mediating apparatus that mediates service provision by a service providing apparatus that provides a service, together with the first certificate, and certificate transmitting means receiving a request for a second certificate valid in the service providing apparatus and the certificate generation request token from the service providing apparatus and transmitting, to the service providing apparatus, the second certificate generated based on the first certificate corresponding to the received certificate generation request token.

A service mediating apparatus according to the present invention is a service mediating apparatus that mediates service provision by a service providing apparatus that provides a service, the service mediating apparatus includes mediating apparatus token forwarding means receiving a certificate generation request token, which is information corresponding to a first certificate valid in the service mediating apparatus, together with the first certificate, from an authentication apparatus that authenticates a user, and forwarding the certificate generation request token and the first certificate to the service providing apparatus that provides the service in response to access from the service mediating apparatus.

A service providing apparatus according to the present invention is a service providing apparatus that provides a service, the service providing apparatus includes certificate requesting means receiving a certificate generation request token, which is information related to a first certificate valid in a service mediating apparatus by a authentication apparatus from the service mediating apparatus that mediates service provision by the service providing apparatus, and transmitting, to the authentication apparatus, the certificate generation request token when requesting a second certificate valid in the service providing apparatus, and certificate receiving means receiving, from the authentication apparatus, the second certificate, which is a certificate transmitted by the authentication apparatus in response to the request of the second certificate by the certificate requesting means and the second certificate being generated based on the first certificate corresponding to the certificate generation request token.

A certificate generating/distributing method according to the present invention is a certificate generating/distributing method whereby an authentication apparatus that authenticates a user distributes a certificate to a service providing apparatus that provides a service and a service mediating apparatus that mediates service provision by the service providing apparatus, the method comprises: the authentication apparatus including a token transmitting step of transmitting, to the service mediating apparatus, a certificate generation request token, which is information corresponding to a first certificate valid in the service mediating apparatus, together with the first certificate; the service mediating apparatus including a mediating apparatus token forwarding step of forwarding, to the service providing apparatus, the certificate generation request token received, that has been transmitted in the token transmitting step; the service providing apparatus including a certificate requesting step of transmitting, to the authentication apparatus, the certificate generation request token received, that has been transmitted in the mediating apparatus token forwarding step, when requesting a second certificate valid in the service providing apparatus; and the authentication apparatus including a certificate transmitting step of transmitting, to the service providing apparatus, the second certificate generated based on the first certificate corresponding to the received certificate generation request token, in response to the request of the second certificate in the certificate requesting step.

A certificate generating/distributing program according to the present invention is a certificate generating/distributing program for an authentication apparatus that authenticates a user to distribute a certificate to a service providing apparatus that provides a service and a service mediating apparatus that mediates service provision by the service providing apparatus, the program causing a computer to execute token transmission processing of transmitting, to the service mediating apparatus, a certificate generation request token, which is information corresponding to a first certificate valid in the service mediating apparatus, together with the first certificate and certificate transmission processing of receiving a request for a second certificate valid in the service providing apparatus and the certificate generation request token from the service providing apparatus and transmitting, to the service providing apparatus, the second certificate being generated based on the first certificate corresponding to the received certificate generation request token.

An authentication apparatus certificate generating/distributing program according to the present invention is an authentication apparatus certificate generating/distributing program for an authentication apparatus that authenticates a user to distribute a certificate to a service providing apparatus that provides a service and a service mediating apparatus that mediates service provision by the service providing apparatus, the program causing a computer to execute token transmission processing of transmitting, to the service mediating apparatus, a certificate generation request token, which is information corresponding to a first certificate valid in the service mediating apparatus, together with the first certificate and certificate transmission processing of receiving a request for a second certificate valid in the service providing apparatus and the certificate generation request token from the service providing apparatus and transmitting, to the service providing apparatus, the second certificate being generated based on the first certificate corresponding to the received certificate generation request token.

A service mediating apparatus certificate generating/distributing program according to the present invention is a service mediating apparatus certificate generating/distributing program for an authentication apparatus that authenticates a user to distribute a certificate to a service providing apparatus that provides a service and a service mediating apparatus that mediates service provision by the service providing apparatus, the program causing a computer to execute mediating apparatus token forwarding processing of forwarding, to the service providing apparatus, a certificate generation request token, which is information corresponding to a first certificate valid in the service mediating apparatus, together with the first certificate, received from the authentication apparatus.

A service providing certificate generating/distributing program according to the present invention is a service providing certificate generating/distributing program for an authentication apparatus that authenticates a user to distribute a certificate to a service providing apparatus that provides a service and a service mediating apparatus that mediates service provision by the service providing apparatus, the program causing a computer to execute certificate request processing of receiving a certificate generation request token, which is information related to a first certificate valid in the service mediating apparatus by the authentication apparatus from the service mediating apparatus and transmitting, to the authentication apparatus, the certificate generation request token when requesting a second certificate valid in the service providing apparatus, and certificate reception processing of receiving, from the authentication apparatus, the second certificate, which is a certificate transmitted by the authentication apparatus in response to the request of the second certificate in the certificate request processing and the second certificate being generated based on the first certificate corresponding to the certificate generation request token.

BRIEF DESCRIPTION OF DRAWINGS

FIG. 29 illustrates an example of description contents of an authentication certificate;

FIG. 30 illustrates an example of a reply message to a certificate distribution request;

FIG. 31 illustrates an example of a certificate generation token and authentication certificate identifier correspondence management table;

FIG. 32 illustrates an example of an authentication certificate for the service providing apparatus;

FIG. 33 illustrates an example of a rent-a-car reservation request message;

FIG. 36 illustrates an example of an attribute certificate generation request message;

FIG. 37 illustrates an example of the attribute certificate;

FIG. 40 illustrates a registration example of an account correspondence management table.

REFERENCE SIGNS LIST

Figure 1:
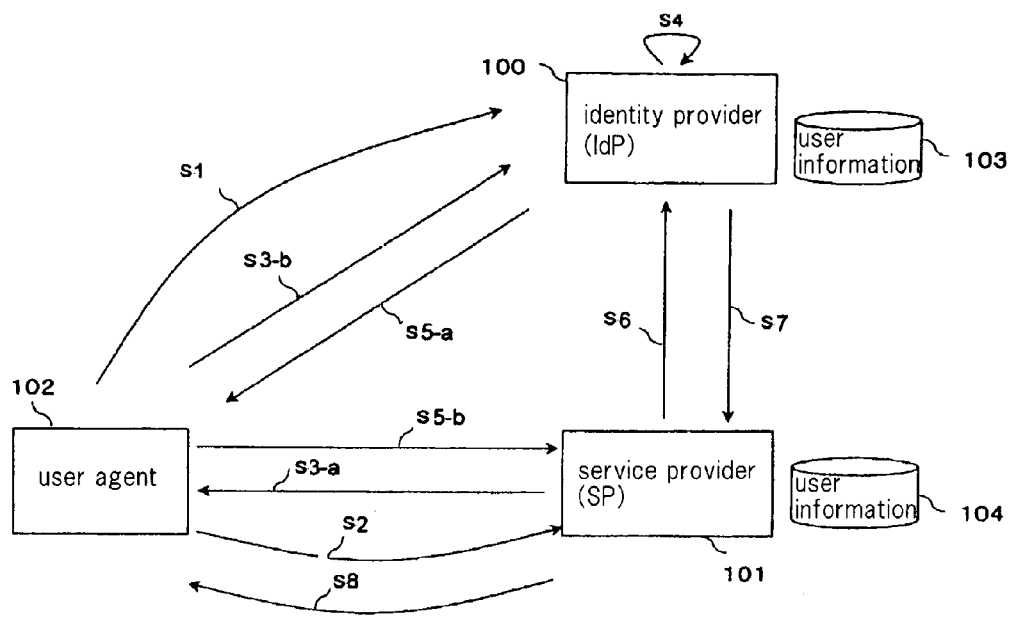
FIG. 1 illustrates an example of a certificate generating/distributing system described in Non-Patent Document 1.

900 Authentication apparatus
901 Token transmitting means
902 Certificate transmitting means
910 Service mediating apparatus
911 Mediating apparatus token forwarding means
920 Service providing apparatus
921 Certificate requesting means

BEST MODE FOR CARRYING OUT THE INVENTION

Figure 3:
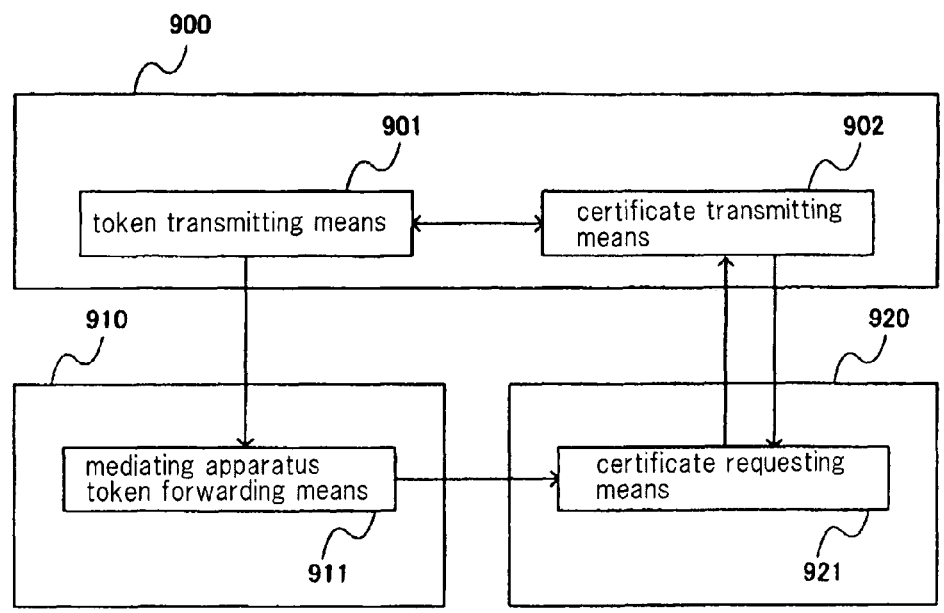
FIG. 3 is a block diagram illustrating a minimum configuration example of a certificate generating/distributing system according to the present invention.

First, an overview of the present invention will be described with reference to the accompanying drawings. FIG. 3 is a block diagram illustrating a minimum configuration example of a certificate generating/distributing system according to the present invention. The certificate generating/distributing system illustrated in FIG. 3 is provided with authentication apparatus 900, service mediating apparatus 910 and service providing apparatus 920.

Authentication apparatus 900 includes token transmitting means 901 and certificate transmitting means 902. Service mediating apparatus 910 includes mediating apparatus token forwarding means 911. Service providing apparatus 920 includes certificate requesting means 921.

Token transmitting means 901 transmits, to service mediating apparatus 910, a certificate generation request token, which is information corresponding to a first certificate valid in service mediating apparatus 910, together with the first certificate.

Mediating apparatus token forwarding means 911 forwards the certificate generation request token received from token transmitting means 901 to service providing apparatus 920.

Certificate requesting means 921 receives the certificate generation request token from mediating apparatus token forwarding means 911 and transmits the certificate generation request token to authentication apparatus 900 when requesting a second certificate valid in service providing apparatus 920.

Certificate transmitting means 902 transmits the second certificate generated based on the first certificate corresponding to the received certificate generation request token to service providing apparatus 920 in response to the request of the second certificate by certificate requesting means 921.

By adopting the configuration as shown in FIG. 3, it is possible to carry out communication required to distribute the certificate more efficiently when distributing the certificate to the service providing apparatus that provides a service in response to proxy access from the service mediating apparatus.

First Exemplary Embodiment

Figure 4:
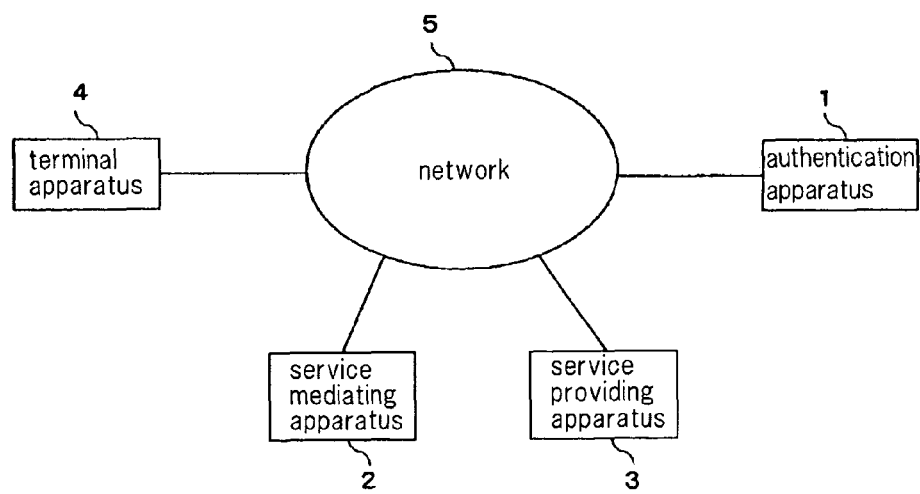
FIG. 4 is a block diagram illustrating a configuration example of the certificate generating/distributing system according to the present invention.

Next, a first exemplary embodiment of the present invention will be described with reference to the accompanying drawings. FIG. 4 is a block diagram illustrating a configuration example of a certificate generating/distributing system according to the present invention. The certificate generating/distributing system shown in FIG. 4 is provided with authentication apparatus 1, service mediating apparatus 2, service providing apparatus 3 and terminal apparatus 4. Authentication apparatus 1, service mediating apparatus 2, service providing apparatus 3 and terminal apparatus 4 are connected to each other via network 5.

There can be a plurality of authentication apparatuses 1, service mediating apparatuses 2, service providing apparatuses 3 and terminal apparatuses 4 respectively. The user accesses authentication apparatus 1 and service mediating apparatus 2 using terminal apparatus 4. The user in the present invention may be an individual or an organization composed of a plurality of individuals.

Figure 5:
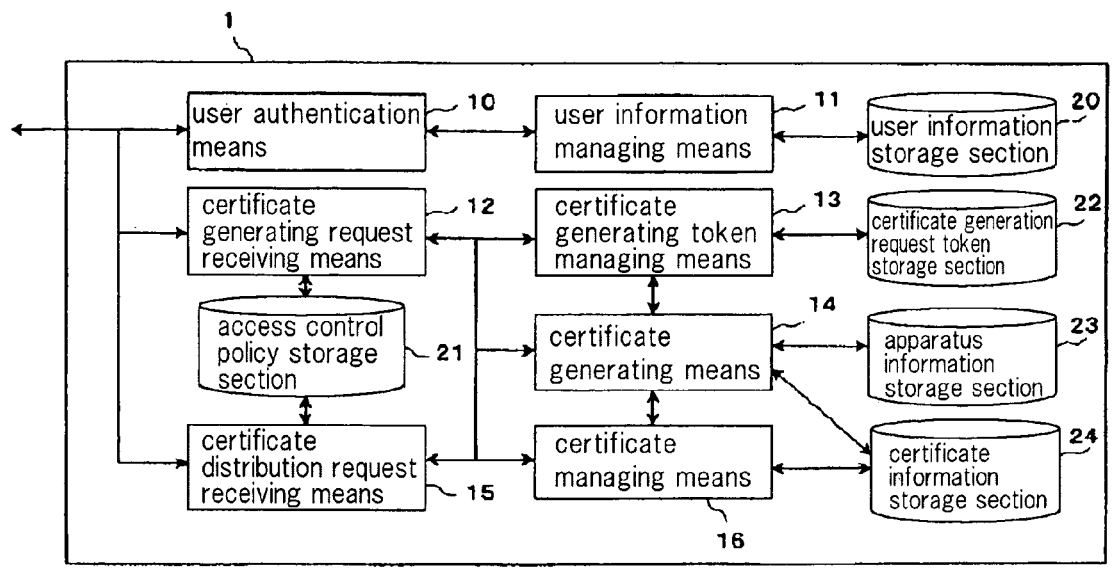
FIG. 5 is a block diagram illustrating a configuration example of the authentication apparatus.

FIG. 5 is a block diagram illustrating a configuration example of authentication apparatus 1. As shown in FIG. 5, authentication apparatus 1 includes user authentication means 10, user information managing means 11, certificate generation request receiving means 12, certificate generation request token managing means 13, certificate generating means 14, certificate distribution request receiving means 15, certificate managing means 16, user information storage section 20, access control policy storage section 21, certificate generation request token storage section 22, apparatus information storage section 23 and certificate information storage section 24.

User authentication means 10 is means for authenticating the user who uses authentication apparatus 1 using a predetermined authentication scheme.

User information managing means 11 is means for managing information on users who are stored in user information storage section 20.

User authentication means 10 asks the user (terminal apparatus 4) to present credential information according to a predetermined authentication scheme (e.g., authentication information such as a password) when authenticating the user. User authentication means 10 performs authentication by comparing and correlating the information presented by the user (terminal apparatus 4) with credential information managed in relation to an identifier or the user obtained from user information storage section 20 via user information managing means 11.

After authentication of the user by user authentication means 10, user information managing means 11 stores session information including information on the user authentication result in user information storage section 20. The session information is information related to authentication of the user using a session identifier which can uniquely identify a session established between authentication apparatus 1 and terminal apparatus 4 as a key. User information managing means 11 searches user information storage section 20 using the session identifier, and can thereby acquire the session information to be related.

User information storage section 20 stores information on users who use authentication apparatus 1. User information storage section 20 stores, for example, information on users' identifiers, attribute information thereof, credential information such as passwords presented when asked for authentication from user authentication means 10 and session information on users authenticated by user authentication means 10.

Certificate generation request receiving means 12 is means for receiving a certificate generation request regarding a user from service providing apparatus 3. The certificate refers to not only an authentication assertion defined by SAML illustrated in FIG. 29 and FIG. 32 as will be described later or attribute assertion (attribute certificate) defined by SAML in FIG. 37 but also a certificate of X.509 or the like.

Certificate request receiving means 12 is provided with a function of checking, upon receiving a message for requesting generation of a certificate regarding the user from service providing apparatus 3, the contents of the certificate generation request message and making an approving/disapproval decision as to whether or not to accept the certificate generation request with reference to an access control policy stored in access control policy storage section 21. Furthermore, certificate request receiving means 12 is also provided with a function of converting or restricting information that can be described in the certificate to be generated to appropriate information according to service providing apparatus 3 that requests the certificate generation.

When certificate request receiving means 12 judges, as a decision result, that the certificate generation request can be accepted, certificate generating means 14 creates the requested certificate. Certificate request receiving means 12 creates a response message with the certificate generated by certificate generating means 14 attached thereto and sends the response message back to service providing apparatus 3.

On the other hand, when certificate request receiving means 12 judges that the certificate generation request cannot be accepted, certificate request receiving means 12 creates a response message including error contents that the certificate generation request cannot be accepted and sends the response message back to service providing apparatus 3.

Access control policy storage section 21 stores an access control policy for certificate generation request receiving means 12 to make an approval/disapproval decision for generating a certificate. The access control policy is information that defines an operation to be adopted by certificate generation request receiving means 12 for a condition regarding contents of certain information. Examples of the access control policy include a specification stating that the generation of a certificate will be accepted if the time at which certificate generation request receiving means 12 accepted the certificate generation request from service providing apparatus 3 is within the term of validity of a predetermined session included in the session information of the user and a specification stating that if service providing apparatus 3 that sent the certificate generation request is not included in the information on the service providing apparatus in apparatus information storage section 23, the generation of the corresponding certificate will not be accepted. The condition and operation specified in the access control policy are written in a predetermined policy description language. Certificate generation request receiving means 12 can automatically read the access control policy.

Certificate generation request token managing means 13 is means for managing a token used by service providing apparatus 3 to request generation of a predetermined certificate.

Certificate generation request token managing means 13 generates a session identifier related to session information of a user authenticated by user authentication means 10 and managed by user information managing means 11. Certificate generation request token managing means 13 generates a certificate generation request token by linking the generated session identifier with an authentication apparatus identifier which can uniquely identify authentication apparatus 1.

Certificate generation request token managing means 13 generates a session identifier so as to be a random value without including any information which might be a sufficient clue to identify the user or session information.

The authentication generation request token can be realized using, for example, the artifact defined by SAML described in Non-Patent Document 1. The authentication generation request token can be anything if it is a random character string (session identifier) which can be uniquely corresponding to the certificate. Furthermore, certificate generation request token managing means 13 stores the generated certificate generation request token in relation to the identifier of the already distributed certificate managed by certificate managing means 16 in certificate generation request token storage section 22 and manages the token so as to be referred to later.

Certificate generating means 14 is means for generating and issuing certificate describing authentication result information, attribute information, authority information or the like about the user based on the apparatus information stored in apparatus information storage section 23. Certificate generating means 14 can assign a signature to the certificate to be generated using a technique such as digital signature. The apparatus to which the certificate is distributed can thereby verify that the received certificate has not been tampered with. Furthermore, certificate generating means 14 stores the generated certificate in certificate information storage section 24.

Apparatus information storage section 23 stores and manages apparatus information on service mediating apparatus 2 or service providing apparatus 3 with which a reliable relationship is maintained through a business contract or the like.

Certificate distribution request receiving means 15 is means for acquiring a necessary certificate and sending the certificate back to service mediating apparatus 2 via certificate managing means 16 in response to the certificate distribution request from service mediating apparatus 2.

Certificate managing means 16 is means for managing certificates stored in certificate information storage section 24. Certificate managing means 16 has a function of searching and referring to appropriate certificates from among certificates stored in certificate information storage section 24 using a search key and updating or deleting a predetermined certificate.

When authentication apparatus 1 is realized by a computer, user authentication means 10, user information managing means 11, certificate generation request receiving means 12, certificate generation request token managing means 13, certificate generating means 14, certificate distribution request receiving means 15 and certificate managing means 16 are realized by a CPU mounted in authentication apparatus 1 executing a program for realizing those functions.

Figure 6:
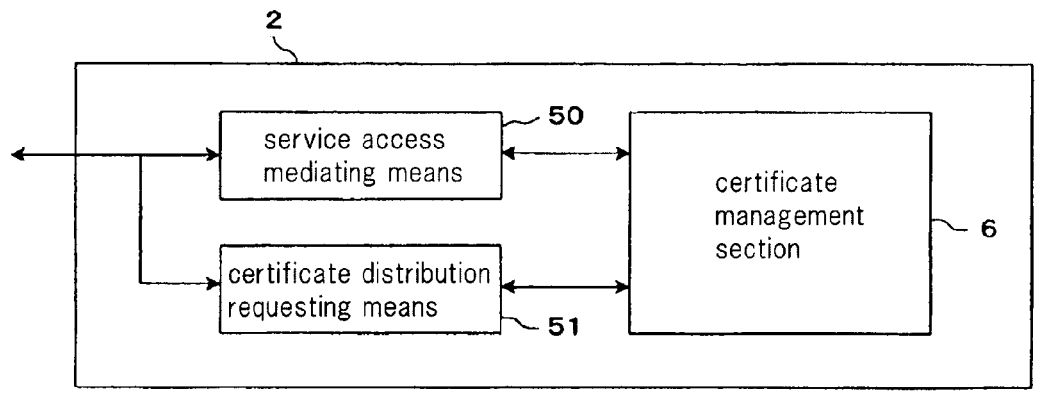
FIG. 6 is a block diagram illustrating a configuration example of the service mediating apparatus.

FIG. 6 is a block diagram illustrating a configuration example of service mediating apparatus 2. As shown in FIG.

6, service mediating apparatus 2 includes service access mediating means 50, certificate distribution requesting means 51 and certificate management section 6.

Service access mediating means 50 is means for receiving a service access request (first service access request) from terminal apparatus 4 of the user or from a service mediating apparatus (second service mediating apparatus) which is different from service mediating apparatus 2, and then making a second service access request to service providing apparatus 3. Service access mediating means 50 makes a service access request (second service access request) which is different from the first service access request in connection with the user who sent the first service access request to service providing apparatus 3 using a predetermined communication protocol.

Service access mediating means 50 acquires (extracts) a certificate distributed from authentication apparatus 1 regarding the user managed by certificate verifying means 62 in certificate management section 6 (see FIG. 7 which will be described later) based on the user identifier of the user.

Furthermore, service access mediating means 50 acquires a certificate generation request token related to a certificate managed by certificate generation request token acquiring means 61, which will be described later, attaches the certificate generation request token to the second service access request message directed to service providing apparatus 3 and makes a service access request to service providing apparatus 3.

Certificate distribution requesting means 51 is means for requesting authentication apparatus 1 to distribute an already generated certificate using a predetermined communication protocol.

When making a certificate distribution request, certificate distribution requesting means 51 acquires detailed information such as the address on the network of authentication apparatus 1 to which the distribution request is to be sent using authentication apparatus information managing means 60. Furthermore, upon receiving the requested certificate from authentication apparatus 1, if a digital signature is affixed to the certificate, certificate distribution requesting means 51 can verify the certificate using certificate verifying means 62 of certificate management section 6.

Furthermore, when a certificate generation request token is also attached to the message including the certificate sent back from authentication apparatus 1, certificate distribution requesting means 51 acquires (extracts) and analyzes the certificate generation request token from the reply message using certificate generation request token acquiring means 61 of certificate management section 6.

Figure 7:
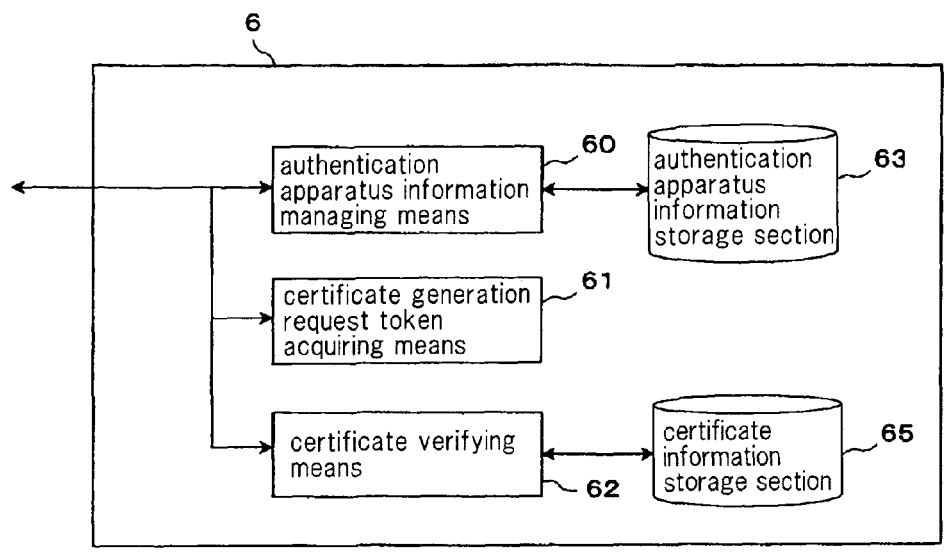
FIG. 7 is block diagram illustrating a configuration example of the certificate management section.

FIG. 7 is a block diagram illustrating a configuration example of certificate management section 6. As shown in FIG. 7, certificate management section 6 includes authentication apparatus information managing means 60, certificate generation request token acquiring means 61, certificate verifying means 62, authentication apparatus information storage section 63 and certificate information storage section 65.

Authentication apparatus information managing means 60 is means for managing information on authentication apparatus 1 stored in authentication apparatus information storage section 63. Authentication apparatus information managing means 60 has a function of acquiring detailed information on the authentication apparatus such as the position information (IP Address) on the network based on the authentication apparatus identifier described in the certificate generation request token.

Certificate generation request token acquiring means 61 acquires a certificate generation request token from a message received by certificate distribution requesting means Certificate verifying means 62 is means for verifying the format and contents of information described in a certificate received from authentication apparatus 1. When, for example, a signature using a signature technique such as a digital signature is attached to the certificate, certificate verifying means 62 verifies the signature, and can thereby verify whether or not the signature has been tampered with. After completion of the verification of the certificate, certificate verifying means 62 stores the verified certificate as an appropriate certificate in certificate information storage section 65 and manages the certificate. Certificate verifying means 62 has a function of acquiring an appropriate certificate using a predetermined search key such as the identifier of the certificate or the identifier of the user.

When service mediating apparatus 2 is realized by a computer, service access mediating means 50, certificate distribution requesting means 51, authentication apparatus information managing means 60, certificate generation request token acquiring means 61 and certificate verifying means 62 are realized by a CPU mounted in service mediating apparatus 2 executing a program for realizing those functions.

Figure 8:
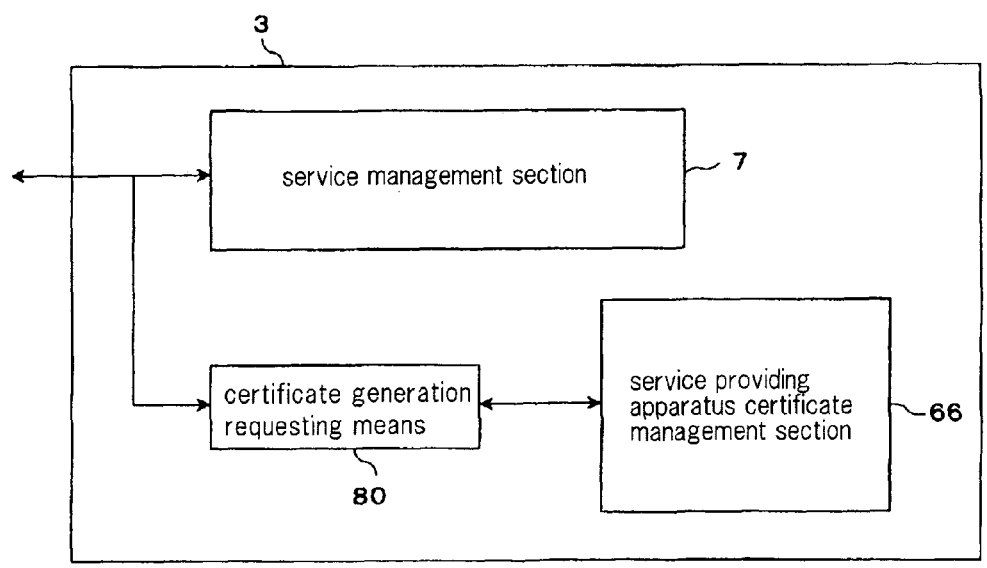
FIG. 8 is a block diagram illustrating a configuration example of the service providing apparatus.

FIG. 8 is a block diagram illustrating a configuration example of service providing apparatus 3. As shown in FIG. 8, service providing apparatus 3 includes certificate generation requesting means 80, service providing apparatus certificate management section 66 and service management section 7.

Figure 9:
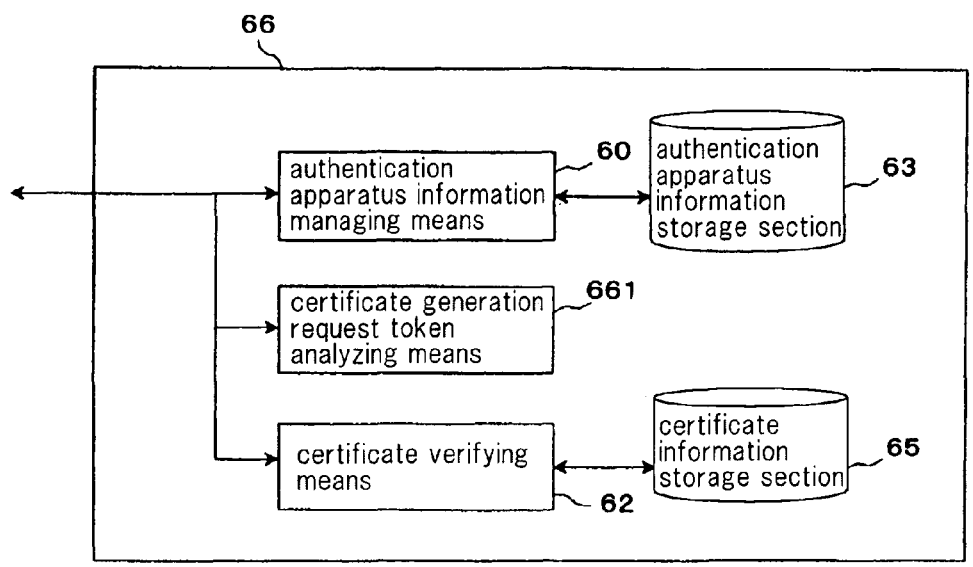
FIG. 9 is a block diagram illustrating a configuration example of the certificate management section for the service providing apparatus.

FIG. 9 is a block diagram illustrating a configuration example of service providing apparatus certificate management section 66. As shown in FIG. 9, service providing apparatus certificate management section 66 includes authentication apparatus information managing means 60, certificate generation request token analyzing means 661, certificate verifying means 62, authentication apparatus information storage section 63 and certificate information storage section 65.

Service providing apparatus certificate management section 66 is a management section that has certificate generation request token analyzing means 661 instead of certificate request token acquiring means 61 in certificate management section 6 (see FIG. 7) of service mediating apparatus 2.

Certificate generation request token analyzing means 661 has a function of analyzing a certificate generation request token received from service mediating apparatus 2 and acquiring (extracting) the identifier of the authentication apparatus and the session identifier included in the token. Certificate generation request token analyzing means 661 manages the certificate generation request token.

Certificate generation requesting means 80 is means for creating a message for making a certificate generation request to authentication apparatus 1 which issued the certificate generation request token and sending the certificate generation request with the certificate generation request token attached thereto.

Detailed information such as the address on the network of authentication apparatus 1 to which the certificate generation request message is sent is extracted by certificate generation request token analyzing means 661 and authentication apparatus information managing means 60. Certificate generation request token analyzing means 661 analyzes the certificate generation request token, extracts the authentication apparatus identifier of authentication apparatus 1 and outputs the authentication apparatus identifier to authentication apparatus information managing means 60. Authentication apparatus information managing means 60 requests authentication apparatus information storage section 63 to refer to the information on authentication apparatus 1 corresponding to the outputted authentication apparatus identifier and thereby extracts the detailed information on authentication apparatus 1.

Figure 10:
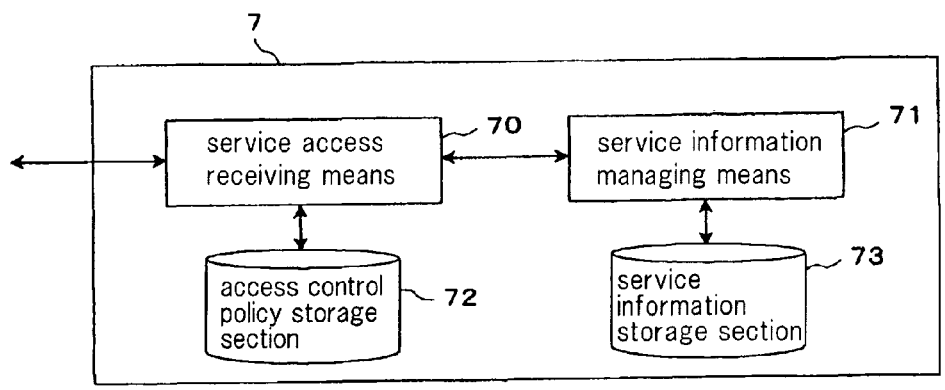
FIG. 10 is a block diagram illustrating a configuration example of the service management section.

FIG. 10 is a block diagram illustrating a configuration example of service management section 7. As shown in FIG. 10, service management section 7 includes service access receiving means 70, service information managing means 71, access control policy storage section 72 and service information storage section 73.

Service access receiving means 70 releases a predetermined application service using service information managed by service information managing means 71 in service information storage section 73. Furthermore, service access receiving means 70 is means for providing a service by exercising control so as to accept only access from predetermined users using an access control policy stored in access control policy storage section 72 in response to access to the service from the users.

Furthermore, service access receiving means 70 is provided with a function of receiving a certificate generation request token from a service providing apparatus other than service providing apparatus 3 using a predetermined communication protocol.

Access control policy storage section 72 stores an access control policy for controlling the method of providing a service provided by service access receiving means 70 according to a predetermined user and situation. The access control policy is information that defines an operation to be adopted by service access receiving means 70 for a condition regarding certain information. Example of the access control policy include a specification stating that only users who possess predetermined attribute information will be granted access to a service and a specification stating that predetermined users will not be granted access to a service only for a predetermined time zone or the like. The condition and operation defined in the access control policy are written in a predetermined policy description language. Service access receiving means 70 can automatically read the access control policy.

Service information managing means 71 is means for managing information specific to a predetermined service stored in service information storage section 73. Furthermore, service information managing means 71 manages information on users stored in service information storage section 73 according to contents of the service.

When service providing apparatus 3 is realized by a computer, certificate generation requesting means 80, authentication apparatus information managing means 60, certificate generation request token analyzing means 661, certificate verifying means 62, service access receiving means 70 and service information managing means 71 are realized by a CPU mounted in service providing apparatus 3 executing a program for realizing those functions.

Terminal apparatus 4 is provided with a communication function directly operated by a user for transmitting credential information requested by user authentication means 10 of authentication apparatus 1 to authenticate a user and using a service provided by service mediating apparatus 2.

Above described authentication apparatus 1, service mediating apparatus 2, service providing apparatus 3 and terminal apparatus 4 are each provided with communication means (not shown). When communicating with each other, the respective communication means of authentication apparatus 1, service mediating apparatus 2, service providing apparatus 3 and terminal apparatus 4 are provided with a mechanism such as SSL (Secure Sockets Layer) or TLS (Transport Layer Security) or a mechanism comparable thereto for preventing interception of messages transmitted/received by a third party. Furthermore, authentication apparatus 1, service mediating apparatus 2, service providing apparatus 3 and terminal apparatus 4 are each provided with an encryption function of notifying the contents of a message transmitted/received only to predetermined parties of communication and of preventing the contents of the message from being revealed to intended parties of communication and provided with a decoding function for decoding the encrypted information received.

Next, operations of the first exemplary embodiment will be described with reference to FIG. 11 to FIG. 16.

First, operations of authentication apparatus 1 will be described with reference to FIG. 11 and FIG. 12. Authentication apparatus 1 is ready to receive a predetermined request message sent from a user or service providing apparatus 3. Authentication apparatus 1 analyzes an access request and performs operation processing according to the contents of the request. The following are descriptions of characteristic operations of the present invention after authentication apparatus 1 authenticates the user of terminal apparatus 4 and generates an authentication certificate.

Operations when authentication apparatus 1 receives a certificate distribution request from service mediating apparatus 2 will be described with reference to FIG. 11. FIG. 11 is a flowchart illustrating a processing example when authentication apparatus 1 receives a certificate distribution request from service mediating apparatus 2.

When authentication apparatus 1 receives a certificate distribution request from service mediating apparatus 2 (step S1101), certificate distribution request receiving means 15 analyzes the certificate distribution request message and acquires (extracts) information on the target user whose certificate is requested, service mediating apparatus 2 that requested the certificate, and, type and contents of the certificate requested or the like from certificate distribution request message (step S1102).

Next, certificate distribution request receiving means 15 refers to information on contents of the certificate distribution request acquired in step S1102, correlates this request with the access control policy stored in access control policy storage section 21 and determines whether or not to accept the certificate distribution request (step S1103).

When the certificate distribution request is not accepted in step S1103 (No), certificate distribution request receiving means 15 creates an error message stating that the certificate distribution request will not be approved (step S1109) and sends the error message back to service mediating apparatus 2 (step S1108).

On the other hand, in step S1103, when the certificate distribution request is accepted (Yes), certificate managing means 16 searches and acquires the corresponding certificate from certificate information storage section 24 based on information on the contents of the certificate distribution request (step S1104) and sends the certificate to certificate distribution request receiving means 15. Next, certificate distribution request receiving means 15 sends the acquired certificate to certificate generation request token managing means 13.

Certificate generation request token managing means 13 generates a certificate generation request token for service providing apparatus 3 to make a certificate generation request by generating random numbers (step S1105). Certificate generation request token managing means 13 then manages the generated certificate generation request token related to the received certificate (step S1106). For example, certificate generation request token managing means 13 stores the certificate generation request token in relation to the certificate identifier in certificate generation request token storage section 22. Certificate generation request token managing means 13 then sends the generated certificate generation request token back to certificate distribution request receiving means 15.

Next, certificate distribution request receiving means 15 creates a reply message to the certificate distribution request accompanied with the certificate generation request token received from certificate generation request token managing means 13 and the certificate acquired in step S1105 (step S1107) and sends the reply message back to service mediating apparatus 2 (step S1108).

A case has been described in the above described operations from step S1101 to step S1108 where authentication apparatus 1 receives a certificate distribution request from service mediating apparatus 2, but there can also be a case where a certificate distribution request is made from service mediating apparatus 2 via terminal apparatus 4, that is, where authentication apparatus 1 receives a certificate distribution request from terminal apparatus 4. In this case, service mediating apparatus 2 may be read as terminal apparatus 4 in the above described operations from step S1101 to step S1108.

Next, operation of authentication apparatus 1 when authentication apparatus 1 receives a certificate generation request from certain service providing apparatus 3 will be described with reference to FIG. 12. FIG. 12 is a flowchart illustrating a processing example where authentication apparatus 1 receives a certificate generation request from service providing apparatus 3.

When authentication apparatus 1 receives a certificate generation request from certain service providing apparatus 3 (step S1201), certificate generation request receiving means 12 analyzes the certificate create request message, identifies the type and contents of the certificate to be created from the certificate create request message and extracts a certificate generation request token (step S1202).

Next, certificate generation request receiving means 12 makes an approval/disapproval decision as to whether or not to accept the certificate creation request from service providing apparatus 3 with reference to the security policy stored in access control policy storage section 21 (step S1203). When it is decided that the certificate generation request is unacceptable (No), certificate generation request receiving means 12 creates an error message (step S1204) and sends the error message back to service providing apparatus 3 (step S1211).

On the other hand, when an approval decision of accepting the certificate generation request is made in step S1203 (Yes), certificate generation request receiving means 12 sends the extracted certificate generation request token to certificate generation request token managing means 13.

Certificate generation request token managing means 13 acquires a certificate identifier related to the received certificate generation request token from certificate generation request token storage section 22. Certificate generation request token managing means 13 sends the certificate identifier to certificate managing means 16.

Certificate managing means 16 acquires the corresponding certificate from certificate information storage section 24 based on the certificate identifier (step S1205) and sends the certificate back to certificate generation request receiving means 12.

Certificate generation request receiving means 12 acquires the user identifier related to the certificate and the session identifier thereof from the information described in the certificate and sends the user identifier and the session identifier together with the information on service providing apparatus 3 to user information managing means 11.

User information managing means 11 acquires information on the user and session information related to service providing apparatus 3 from user information storage section 20 based on the user identifier, session identifier and information on service providing apparatus 3 (step S1206) and sends the information to certificate generation request receiving means 12.

Next, certificate generation request receiving means 12 requests certificate generating means 14 to generate a certificate accompanied with information on the user related to service providing apparatus 3 and session information thereof.

Certificate generating means 14 acquires necessary information as information on service providing apparatus 3 from apparatus information storage section 23, generates the requested certificate using the information on the user and the session information thereof (step S1207) and outputs the certificate to certificate generation request receiving means 12. Certificate generation request receiving means 12 sends the newly created certificate to certificate generation request token managing means 13.

Figure 11:
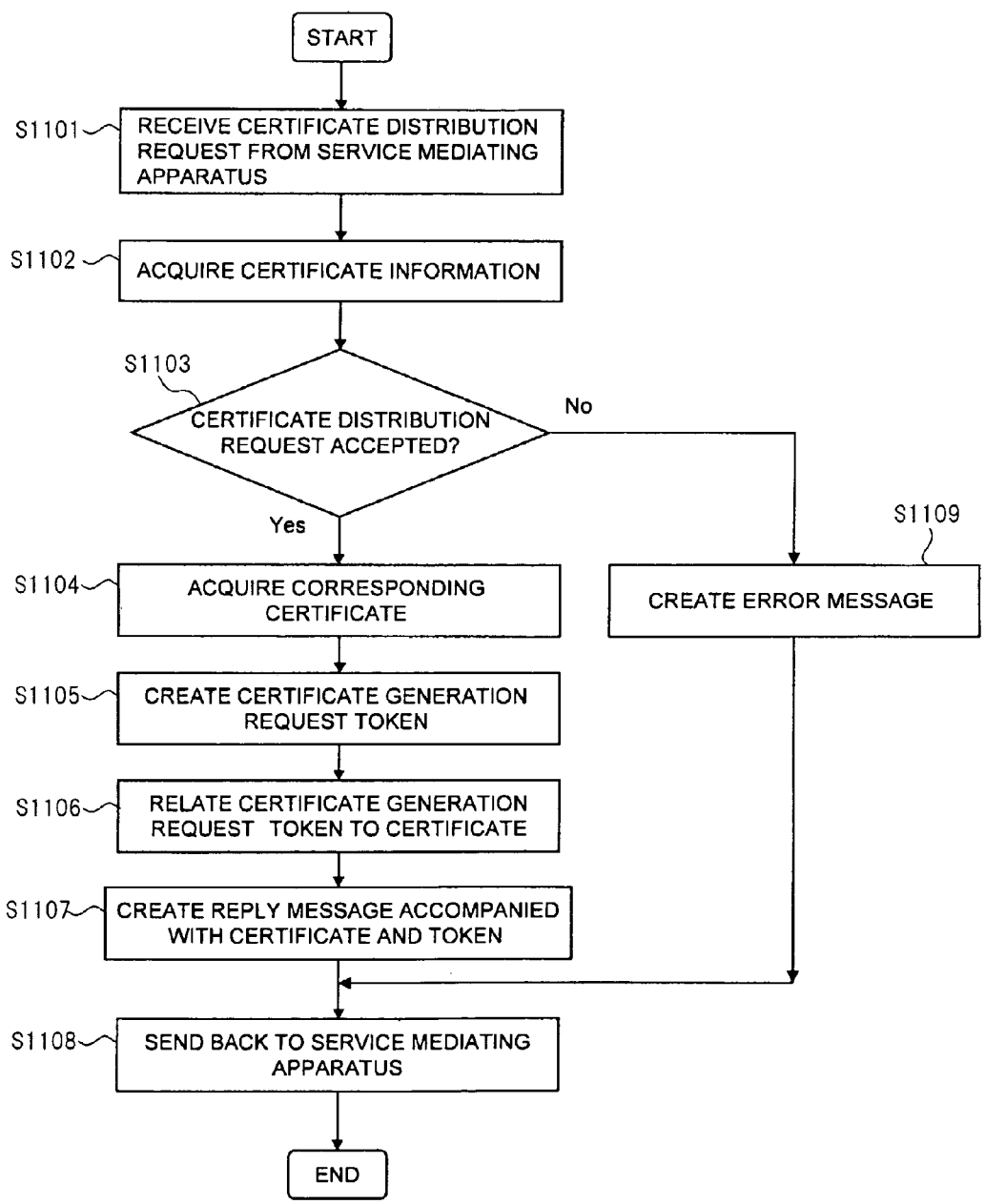
FIG. 11 is a flowchart illustrating an example of processing when the authentication apparatus receives a certificate distribution request from the service mediating apparatus.
Figure 12:
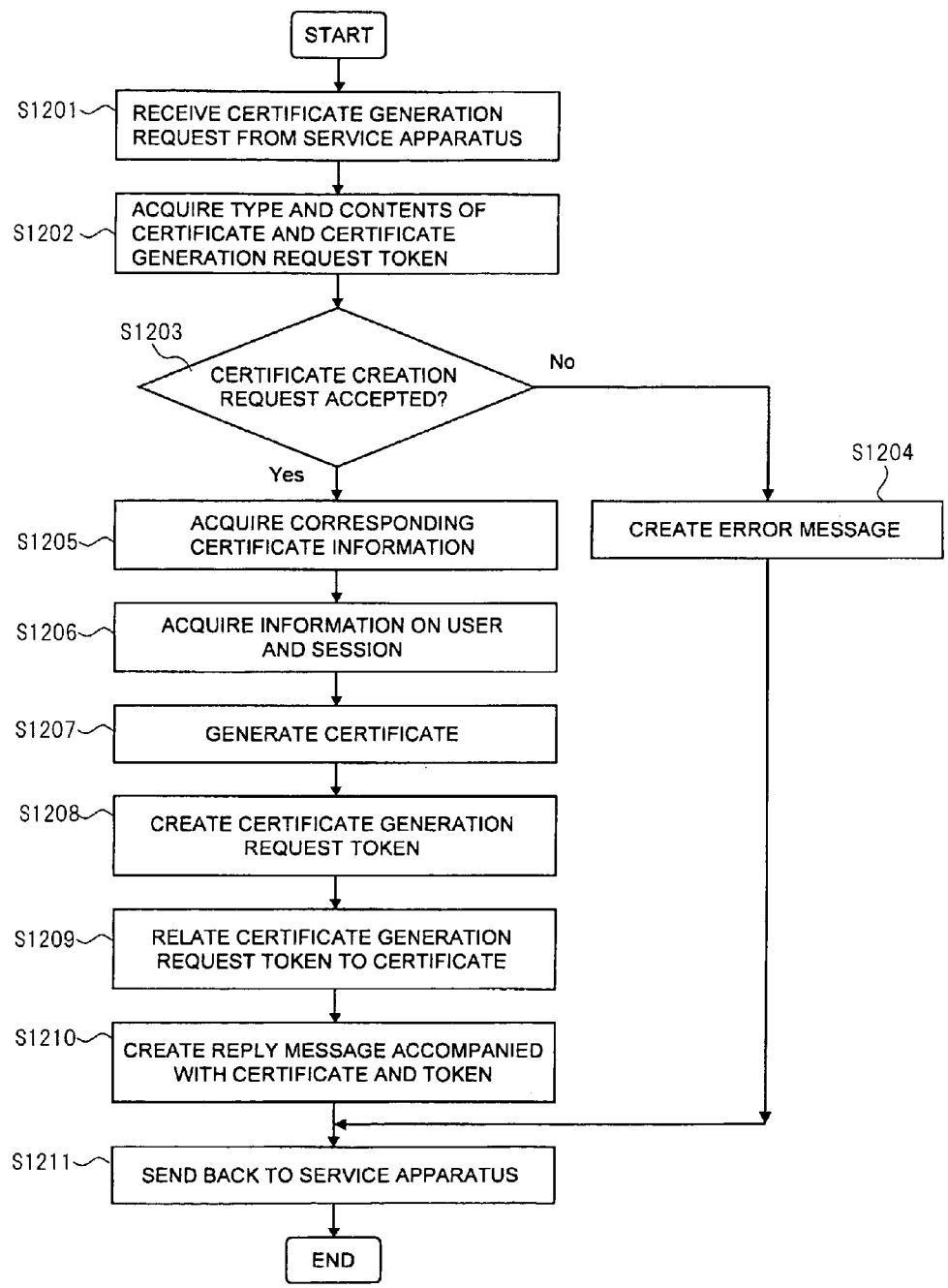
FIG. 12 is a flowchart illustrating an example of processing when the authentication apparatus receives a certificate generation request from the service providing apparatus.

The subsequent processing in steps S1208 to S1210 is substantially the same as the contents of the processing in steps S1105 to S1107 in FIG. 11. Certificate generation request token managing means 13 generates a certificate generation request token for service providing apparatuses other than service providing apparatus 3 to make a certificate generation request by generating random numbers (step S1208) and manages the certificate generation request token related to the certificate showing that the certificate generation request token has been received (step S1209). Certificate generation request token generating means 13 sends the certificate generation request token generated to certificate generation request receiving means 12.

Certificate generation request receiving means 12 creates a reply message to the certificate distribution request accompanied with the certificate generation request token received from certificate generation request token managing means 13 and the certificate acquired in step S1208 (step S1210) and sends the reply message back to service providing apparatus 3 (step S1211).

A case has been considered in the above description where service providing apparatus 3 operates as a service mediating apparatus and also mediates other service providing apparatuses, but when service providing apparatus 3 does not operate as a service mediating apparatus, service providing apparatus 2 does not perform the processing in steps S1208 and S1209. Service providing apparatus 2 then creates a reply message to the certificate distribution request with only the certificate attached in step S10.

Next, operations of service mediating apparatus 2 or service providing apparatus 3 will be described with reference to FIG. 13 to FIG. 16.

Figure 13:
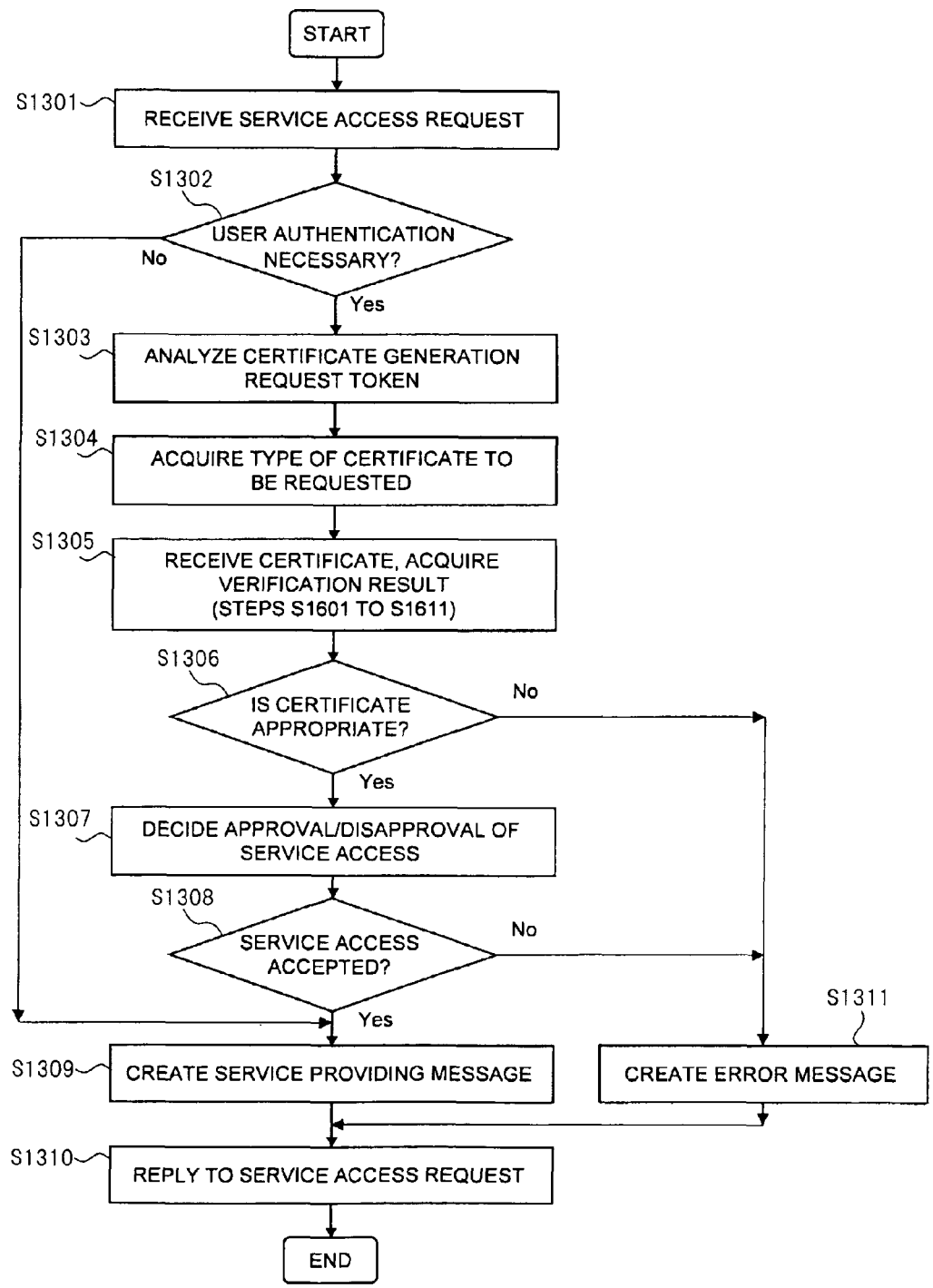
FIG. 13 is a flowchart illustrating an example of processing when the service providing apparatus receives a service access request.

The operation when service providing apparatus 3 receives a service access request will be described with reference to FIG. 13. FIG. 13 is a flowchart illustrating a processing example when service providing apparatus 3 receives a service access request.

Service providing apparatus 3 is ready to receive a predetermined request message sent from the user (terminal apparatus 4) or service mediating apparatus 2. Furthermore, service providing apparatus 3 is ready to transmit a predetermined request message to authentication apparatus 1.

Upon receiving an access request, service providing apparatus 3 analyzes the message and performs operation processing corresponding to the contents of the request. Furthermore, service providing apparatus 3 performs operation processing of creating a request message or the like triggered by a predetermined event. Hereinafter, the processing of accepting proxy access by service providing apparatus 3, which is a characteristic operation of the present invention, will be described.

The operation in a case where service providing apparatus 3 receives an access request for a service released by service providing apparatus 3 from the user (terminal apparatus 4) or service mediating apparatus 2 will be described with reference to FIG. 13.

Service providing apparatus 3 releases a predetermined service. Upon receiving an access request for a release service from the user (terminal apparatus 4) or service mediating apparatus 2 (step S1301), service access receiving means 70 of service management section 7 of service providing apparatus 3 checks whether or not user authentication regarding the access request is necessary (step S1302). When authentication regarding the release service is unnecessary or when the access request includes a session identifier or certificate or the like, and when the user can thereby be authenticated and new authentication processing is unnecessary (No), service information managing means 71 creates a reply message stating that a release service will be provided (step S1309), and service access receiving means 70 sends the reply message back to the requester of the access request (step S1310).

On the other hand, when user authentication regarding the access request is necessary (Yes), service access receiving means 70 analyzes the access request, acquires (extracts) a certificate generation request token and identifies an authentication apparatus (step S1303).

Next, service access receiving means 70 acquires the type of the certificate necessary to receive the service access from service information managing means 71 (step S1304) and sends the type of the certificate together with the certificate generation request token to certificate generation requesting means 80. In the processing from step S1601 to step S1611, which will be described later, certificate generation requesting means 80 receives the requested certificate from authentication apparatus 1 that issued the certificate generation request token and sends the certificate to service access receiving means 70. Furthermore, certificate verifying means 62 verifies the received certificate (step S1305).

Next, service access receiving means 70 checks the contents of the certificate verification result (step S1306). When the certificate verification result is correct and the certificate is an appropriate certificate (Yes), service access receiving means 70 correlates the description contents of the certificate or information on the user managed by service information managing means 71 with the security policy stored in access control policy storage section 72 (step S1307).

When checking the correlation result (step S1308) and accepting service access (Yes), service information managing means 71 creates a reply message for providing a service (step S1309). On the other hand, when service access is not accepted (No) as a result of the correlation, service information managing means 71 creates an error message stating that the service access is not accepted (step S1311) and service access receiving means 70 sends the error message back to the requester of the access request (step S1310).

On the other hand, when the certificate verification result is incorrect (No) in step S1306, service information managing means 71 creates an error message stating that the service access will not be accepted (step S1311) and service access receiving means 70 sends the error message back to the requester of the access request (step S1310).

Figure 14:
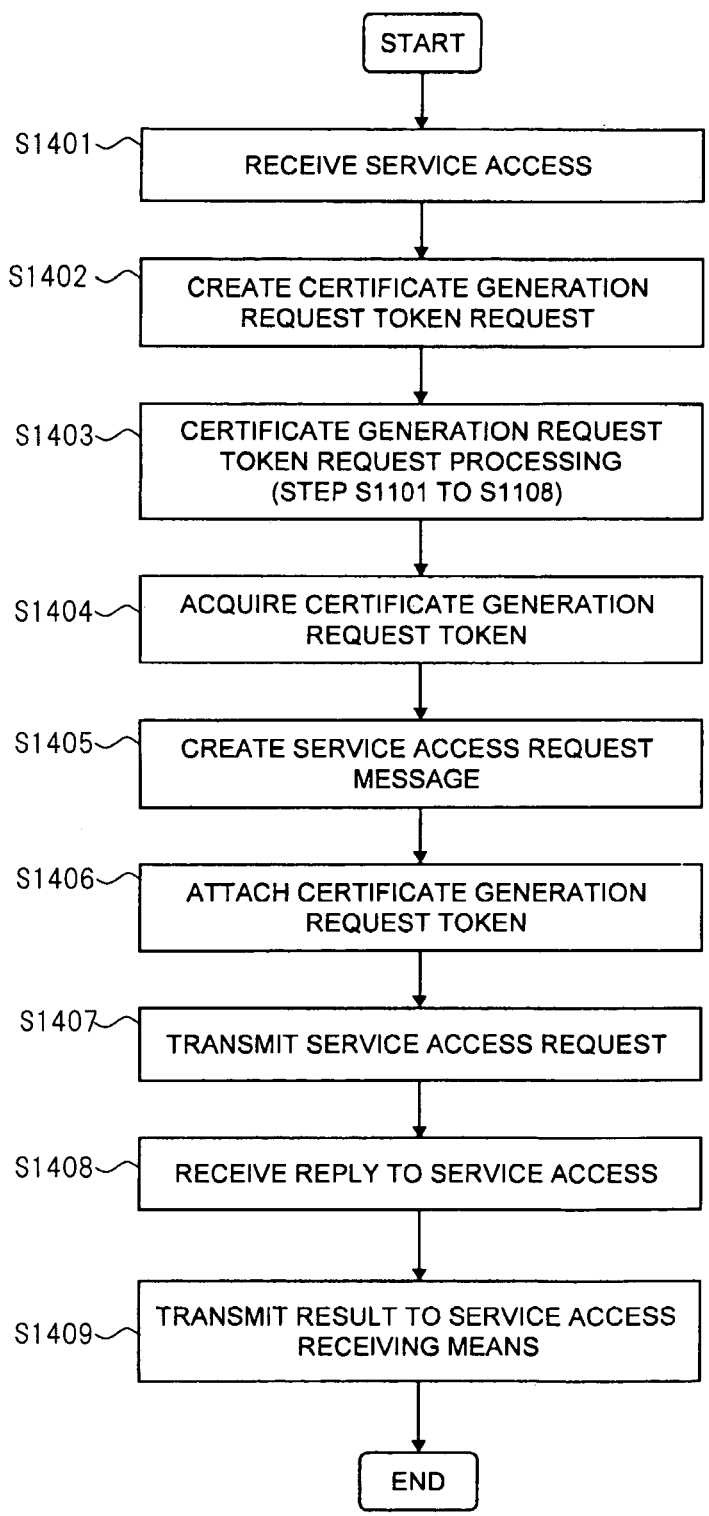
FIG. 14 is a flowchart illustrating an example of processing when the service mediating apparatus mediates access to the service providing apparatus.

Next, the operation when service mediating apparatus 2 mediates access to the service for service providing apparatus 3 will be described with reference to FIG. 14. FIG. 14 is a flowchart illustrating a processing example where service mediating apparatus 2 mediates access to service providing apparatus 3.

Service access mediating means 50 of service mediating apparatus 2 receives a service access request from a user (terminal apparatus 4) for a service provided by service providing apparatus 3 (step S1401).

After that, service mediating apparatus 2 creates a message for requesting a certificate generation request token for authentication apparatus 1 and sends the message to authentication apparatus 1 (step S1402).

Next, service mediating apparatus 2 receives from authentication apparatus 1, a reply message accompanied with a certificate generation request token regarding the user of the service access request which authentication apparatus 1 created through the operation shown in FIG. 11 (step S1403).

Next, certificate generation request token acquiring means 61 extracts the certificate generation request token from the reply message to the certificate distribution request (step S1404). Service access mediating means 50 then creates a service access request message for the service released by service providing apparatus 3 using a predetermined protocol (step S1405), attaches a certificate generation request token thereto (step S1406) and sends the service access request message to service providing apparatus 3 (step S1407).

Next, service access mediating means 50 receives the reply message from service providing apparatus 3 (step S1408) and sends the contents of the service mediation result for service providing apparatus 3 to terminal apparatus 4 based on the contents of the reply message (step S1409).

Figure 15:
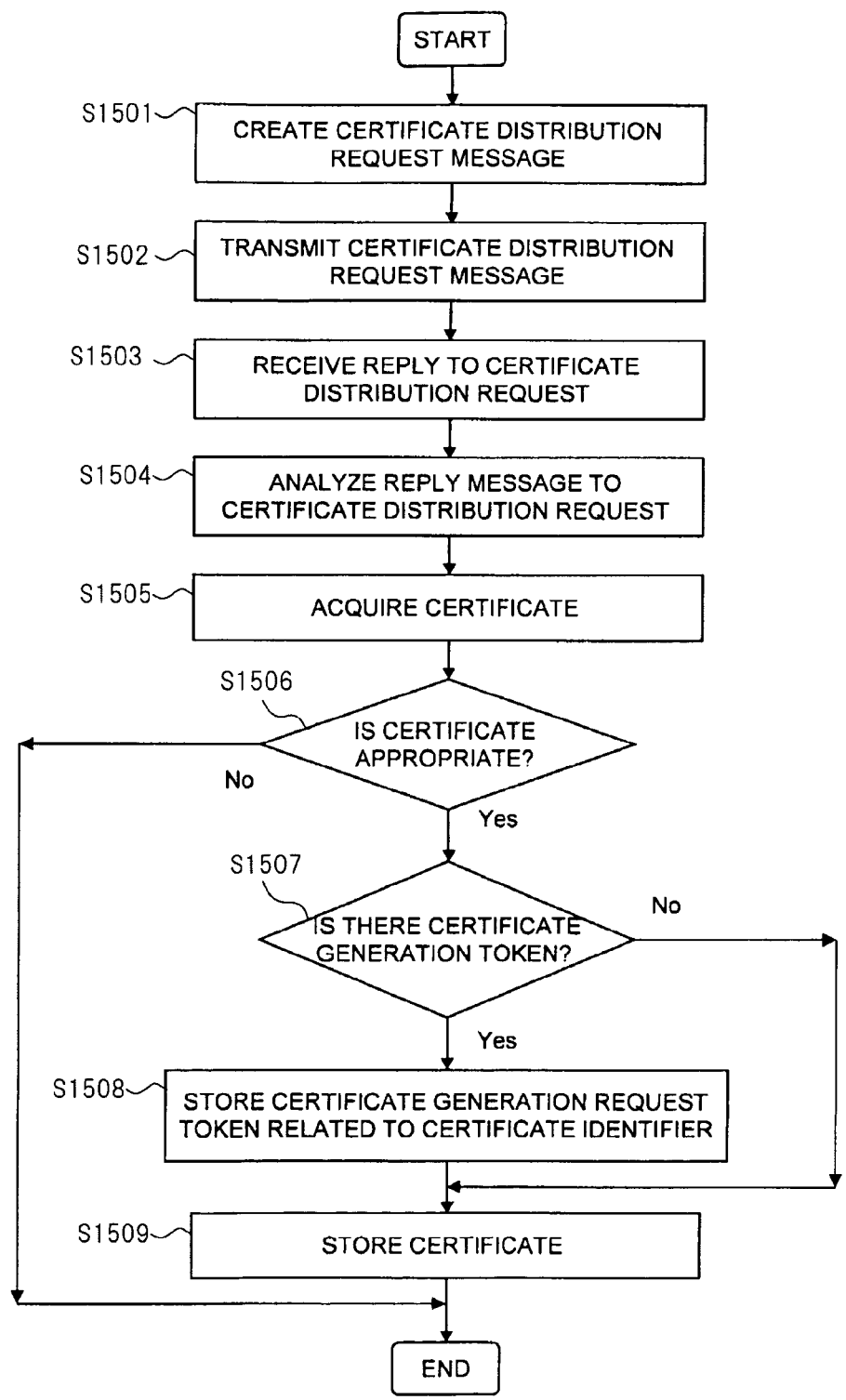
FIG. 15 is a flowchart illustrating an example of processing when the service mediating apparatus receives a certificate from the authentication apparatus.

The operation when service mediating apparatus 2 receives a certificate distributed from authentication apparatus 1 will be described with reference to FIG. 15. FIG. 15 is a flowchart illustrating a processing example when service mediating apparatus 2 receives a certificate from authentication apparatus 1.

Certificate distribution requesting means 51 of service mediating apparatus 2 creates a certificate distribution request message using a predetermined communication protocol (step S1501). In this case, the certificate distribution request message stores information that can identify a certificate whose distribution is requested corresponding to a predetermined protocol. Certificate distribution requesting means 51 then sends a certificate distribution request message to certificate distribution request receiving means 15 of predetermined authentication apparatus 1 (step S1502).

Next, after communications have been placed in a standby state, certificate distribution requesting means 51 receives a reply message to the certificate distribution request from certificate distribution request receiving means 15 of authentication apparatus 1 (step S1503).

Next, certificate distribution requesting means 51 analyzes the reply message (step S1504), extracts a certificate (step S1505) and sends the certificate to certificate verifying means 62. Certificate verifying means 62 verifies the certificate and checks whether or not the contents have been tampered with and whether or not the contents has been described by authentication apparatus 1 (step S1506). When the certificate is confirmed to be illegal (No), processing is finished immediately.

On the other hand, when the certificate can be confirmed to be appropriate (Yes), certificate distribution requesting means 51 analyzes the reply message and examines whether or not any certificate generation request token is included (step S1507).

In step S1507, when certificate distribution requesting means 51 judges that a certificate generation request token is included (Yes), certificate distribution requesting means 51 sends the certificate generation request token to certificate generation request token acquiring means 61. Furthermore, certificate generation request token acquiring means 61 analyzes the certificate generation request token (step S1508) and certificate verifying means 62 stores the certificate in certificate information storage section 65 (step S1509).

On the other hand, when certificate distribution requesting means 51 judges in step S1507 that no certificate generation request token is included in the reply message (No), certificate verifying means 62 stores the certificate in certificate information storage section 65 (step S1509) and finishes the processing.

Figure 16:
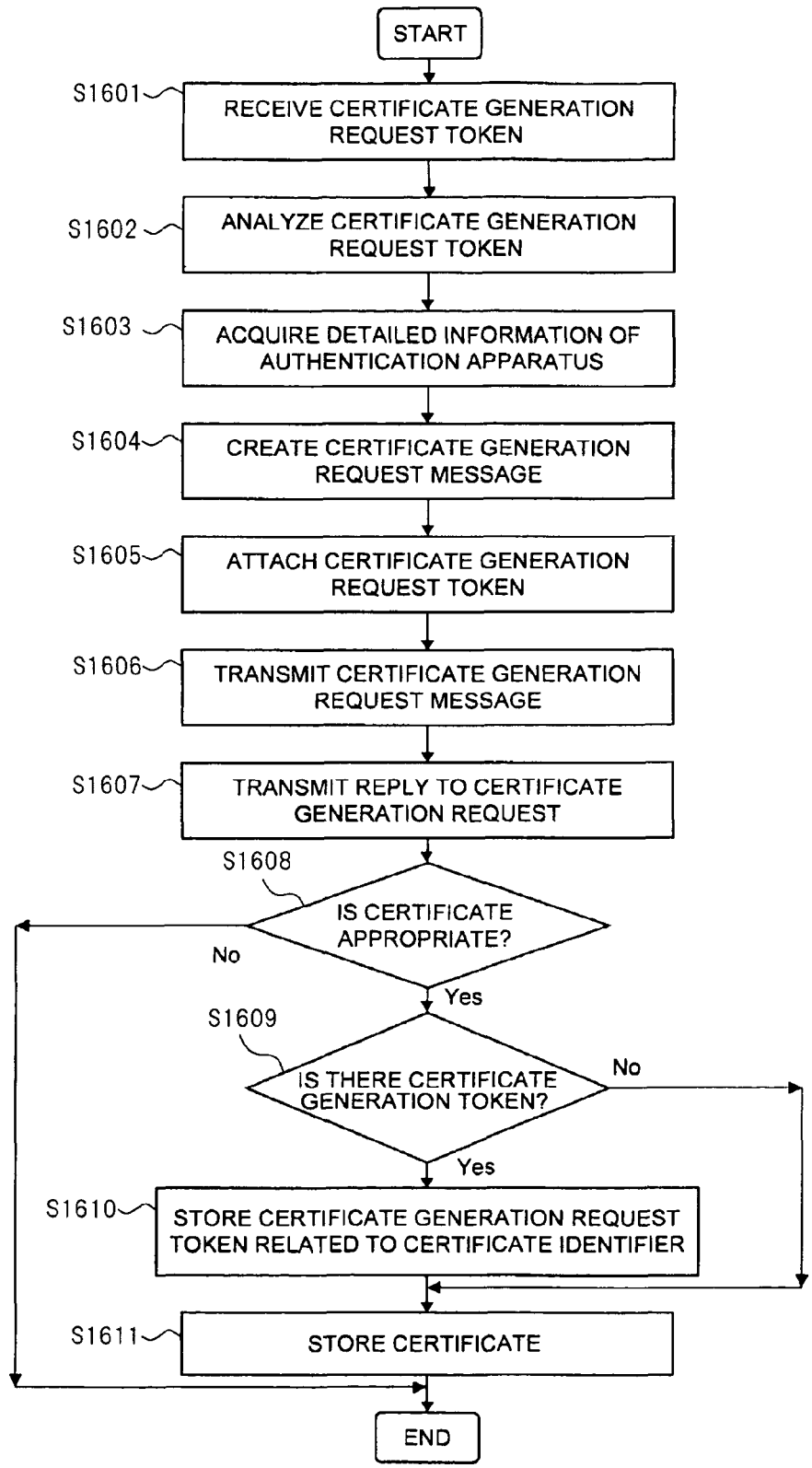
FIG. 16 is a flowchart illustrating an example of processing when the service providing apparatus requests the authentication apparatus for a certificate and receives the certificate.

Next, the operation when service providing apparatus 3 requests authentication apparatus 1 to generate a certificate and distributes the requested certificate, will be described with reference to FIG. 16. FIG. 16 is a flowchart illustrating a processing example when service providing apparatus 3 requests authentication apparatus 1 for the certificate and receives the certificate.

Service access receiving means 70 in service management section 7 of service providing apparatus 3 receives the certificate generation request token together with the service access request sent by service access mediating means 50 of service mediating apparatus 2 (step S1601).

After that, certificate generation request token analyzing means 661 in service providing apparatus certificate management section 66 of service providing apparatus 3 analyzes the certificate generation request token (step S1602). As a result of the analysis, certificate generation request token analyzing means 661 acquires identifier information included in the certificate generation request token of authentication apparatus 1 that issued the certificate generation request token and sends the identifier information to authentication apparatus information managing means 60.

Authentication apparatus information managing means 60 acquires detailed information such as the address on the network of authentication apparatus 1 from the identifier information of authentication apparatus 1 (step S1603) and sends the detailed information to certificate generation requesting means 80.

Certificate generation requesting means 80 creates a certificate generation request message for service providing apparatus 3 directed to authentication apparatus 1 from the detailed information on authentication apparatus 1 using a predetermined communication protocol (step S1604), attaches the certificate generation request token thereto (step S1605) and sends the certificate generation request message to certificate generation request receiving means 12 of authentication apparatus 1 (step S1606).

After that, certificate generation requesting means 86 transitions to a communication waiting state, then receives a reply message from certificate generation request receiving means 12 of authentication apparatus 1 (step S1607) and verifies and stores the certificate included in the reply message as in the case of the processing in steps S1506 to S1509 (steps S1608 to S1611).

In the above described operation of the first exemplary embodiment, the timing of issuing a certificate directed to the proxy access destination apparatus (service providing apparatus 3) is the timing at which authentication apparatus 1 receives the certificate generation request message, but a certificate for service providing apparatus 3 may also be issued when authentication apparatus 1 issues a certificate generation request token directed to service providing apparatus 3. In such a case, when the certificate generation request token is generated, a certificate is generated and registered with certificate information storage section 24. Furthermore, when authentication apparatus 1 receives a certificate generation request message transmitted by service providing apparatus 3, certificate generation request receiving means 12 searches certificate information storage section 24 using certificate managing means 16, acquires the certificate and responds to service providing apparatus 3. The certificate directed to service providing apparatus 3 means, for example, a certificate valid in service providing apparatus 3.

According to the first exemplary embodiment, generation and distribution of a certificate regarding the user are performed through direct communication between the authentication apparatus and service providing apparatus by bypassing the terminal apparatus. Thus, since the number of redirects via the terminal apparatus decreases and the number of times communication is carried out decreases, it is possible to improve the efficiency of communication.

For example, even if an attempt is made to realize proxy access to the second SP by bypassing any user agent by adding the function of a user agent to the first SP using the technique described in Non-Patent Document 1, communication becomes inefficient.

A case will be described where a first SP attempts proxy access for a user who is authenticated by IdP 100 and who is accessing the service of the first SP, to a second SP which is different from the first SP, by applying the certificate generating/distributing system described in Non-Patent Document 1. In this case, the second SP needs to distribute a certificate regarding the user from IdP 100.

A case will be described where the function of a user agent is added to the first SP, and proxy access to the second SP is thereby realized using the technique described in Non-Patent Document 1 by bypassing the user agent. An example of a processing flow that realizes proxy access by bypassing the user agent will be described with reference to FIG. 2.

Figure 2:
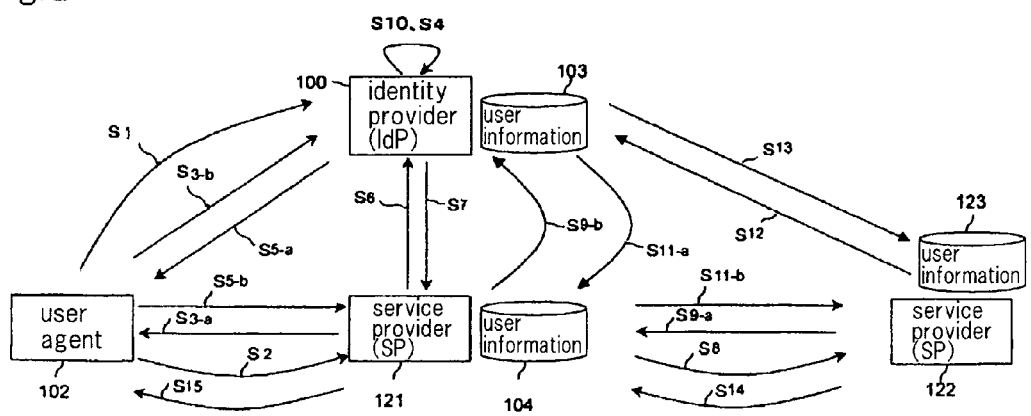
FIG. 2 illustrates an example of proxy access processing in the certificate generating/distributing system described in Non-Patent Document 1.

FIG. 2 illustrates an example of a case where proxy access processing is performed by applying the certificate generating/distributing system described in Non-Patent Document 1. The certificate generating/distributing system shown in FIG. 2 is provided with SP 121 (first SP) instead of SP 101 shown in FIG. 1. Furthermore, the certificate generating/distributing system shown in FIG. 2 is provided with SP 122 (second SP) which is not provided for the system shown in FIG. 1. FIG. 2 illustrates an example where the user accesses SP 121 first and SP 121 then accesses SP 122 on behalf of the user.

The certificate generating/distributing system shown in FIG. 2 performs the same processing as that of the related art shown in FIG. 1 until the user accesses SP 121 (from step S1 to step S7). The processing from step S8 onward is processing whereby SP 121 accesses a service (SP 122) and SP 122 provides the service instead of the processing shown in FIG. 1 whereby user agent 102 accesses SP 101 and SP 101 provides a service.

First, when SP 121 acquires an authentication assertion of the user, SP 121 performs proxy access to SP 122 as the user agent (step S8). SP 122 sends an authentication request message to IdP 100 to authenticate the accessing entity (step S9-*a*) and SP 121 redirects the authentication request message from SP 122 to IdP 100 (step S9-*b*).

IdP 100 confirms in step S1 that the user has been authenticated and creates an authentication certificate in XML description for certifying that the user has been authenticated (authentication assertion) (step S10). This authentication certificate is issued to SP 122 and is different from the authentication certificate for SP 121 created in step S4.

Furthermore, IdP 100 creates an artifact which plays a role of a ticket for the created authentication assertion and sends the artifact back to SP 121 (step S11-*a*). SP 121 redirects the received artifact to SP 122 (step S11-*b*). SP 122 receives the artifact, sends the received artifact to IdP 100 and requests a corresponding authentication assertion (step S12).

IdP 100 checks the artifact received from SP 122 and sends the corresponding authentication assertion back to SP 122 (step S13). SP 122 checks the authenticity of the authentication assertion received from IdP 100, verifies whether or not to accept a service access request by the user using the security policy of SP 122 and starts to provide the service to SP 121 when the access request is accepted (step S14). This completes the proxy access of SP 121 and SP 121 finally provides the service to the user agent (step S15).

As described above, even if an attempt is made to realize proxy access to the second SP by bypassing the user agent by adding the function of a user agent to the first SP using the technique described in Non-Patent Document 1, the same authentication processing (steps S9-*a* to S13) as the authentication processing (steps S3-*a* to S7) already performed by the first SP needs to be performed by the second SP via the first SP. This complicates the processing and makes communication inefficient. By contrast, according to the present exemplary embodiment, the generation and distribution of a certificate regarding the user are carried out through direct communication between the authentication apparatus and service providing apparatus, and therefore the number of redirects via the terminal apparatus decreases and the number of times that communication is carried out decreases, and the efficiency of communication can thereby be improved.

When compared to the case where proxy access to the service providing apparatus is realized by adding the function of a user agent to the service mediating apparatus, the first exemplary embodiment decreases the number of redirects via the service mediating apparatus and decreases the number of times that communication is carried out, and can thereby improve the efficiency of communication.

Furthermore, not the certificate itself but a certificate generation request token of a smaller amount of information than the certificate is exchanged between the service mediating apparatus and the service providing apparatus. This decreases the number of times that communication is carried out and decreases the amount of communication accompanying the distribution of the certificate and improves the efficiency.

Furthermore, according to the first exemplary embodiment, the service providing apparatus, which has received the certificate generation request token, makes a certificate generation request to the authentication apparatus using the certificate generation request token and the authentication apparatus generates a certificate upon receiving the certificate generation request. Thus, the authentication apparatus no longer needs to generate in advance and manage a certificate, the use or non-use of which is unknown, or generate an unnecessary certificate, and can thereby reduce processing cost or management cost corresponding to certificate generation.

Furthermore, according to the first exemplary embodiment, the certificate generation request token for making a request for generating a certificate regarding a user is exchanged between the service mediating apparatus and the service providing apparatus. The certificate generation request token itself does not include enough information to identify the user. Thus, it is possible to prevent leakage of confidential information in the processing operation corresponding to the generation and distribution of the certificate, and to protect privacy.

Second Exemplary Embodiment

Next, the second exemplary embodiment of the present invention will be described with reference to the accompanying drawings.

Figure 17:
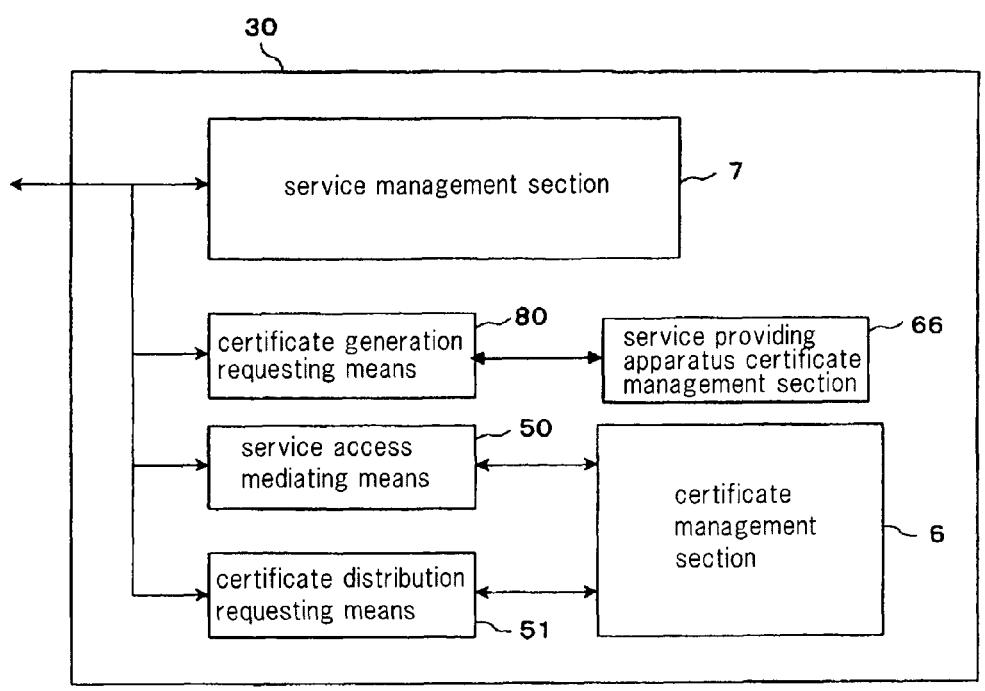
FIG. 17 is a block diagram illustrating a configuration example of a service mediating apparatus according to a second exemplary embodiment.

FIG. 17 is a block diagram illustrating a configuration example of service mediating apparatus 30 according to the second exemplary embodiment. As shown in FIG. 17, service mediating apparatus 30 according to the second exemplary embodiment is different from the first exemplary embodiment in that service mediating apparatus 30 includes service management section 7, certificate generation requesting means 80 and service providing apparatus certificate management section 66 in addition to the configuration of service mediating apparatus 2 of the first exemplary embodiment shown in FIG. 6. Components similar to those in service mediating apparatus 2 according to the first exemplary embodiment will be assigned the same reference numerals as those in FIG. 6 and descriptions thereof will be omitted.

A preferred aspect of the certificate generating/distributing system of the second exemplary embodiment is that the certificate generating/distributing system is provided with, for example, authentication apparatus 1, service mediating apparatus 2, service providing apparatus 3 and terminal apparatus 4 shown in FIG. 4. Authentication apparatus 1, service mediating apparatus 2, service providing apparatus 3 and terminal apparatus 4 are connected to each other via network 5.

Authentication apparatus 1 of the certificate generating/distributing system of the second exemplary embodiment is provided with, as shown in FIG. 5, user authentication means 10 for authenticating a user with reference to user information managed by user information managing means 11 in user information storage section 20 using a predetermined authentication scheme, certificate generation request receiving means 12 for receiving a certificate generation request from another service providing apparatus, making an approval/disapproval decision as to whether or not to accept a certificate request with reference to a security policy managed by access control policy storage section 21 according to the type of the requested certificate and certificate generation request token included in the certificate generation request, and generating and distributing the requested certificate via certificate generating means 14, certificate distribution request receiving means 15 for receiving an already generated certificate distribution request from the other service providing apparatus, acquiring and distributing a certificate whose distribution is requested via certificate managing means 16 based on the certificate distribution request, certificate generation request token managing means 13 for issuing a certificate generation request token, which is an identifier related to the certificate that has been requested to receive the certificate generation request from the other service providing apparatus and managing the certificate generation request token in certificate generation request token storage section 22, certificate generating means 14 for generating a certificate that has been requested based on service providing apparatus information stored in apparatus information storage section 23 regarding the user related to the certificate generation token included in the certificate generation request from the other service providing apparatus and managing the certificate in certificate information storage section 24, and certificate managing means 16 for managing the certificate generated by the certificate generating means related to the identifier of the certificate in the certificate information storage section.

As shown in FIG. 10 and FIG. 17, service mediating apparatus 30 of the certificate generating/distributing system according to the second exemplary embodiment is provided with service access receiving means 70 for releasing a predetermined service using service information stored in service information storage section 73 of service management section 7 and managed by service information managing means 71, referring to a security policy managed by access control policy storage section 72 in response to a service access request from the user and for granting access to only predetermined users, service access mediating means 50 for receiving a service access request (first service access request) from a service access request from the user or from a service mediating apparatus, which is different from the service mediating apparatus, then making a service access request (second service access request), which is different from the service access request regarding the user who made the service access request using a predetermined communication protocol including the certificate generation request token to the service providing apparatus, and certificate management section 6 provided with functions of verifying the certificate, analyzing the certificate generation request token and managing the authentication apparatus information.

Service providing apparatus 3 of the certificate generating/distributing system of the second exemplary embodiment, as shown in FIG. 8, FIG. 9 and FIG. 10, is provided with service access receiving means 70 for releasing a predetermined service using service information stored in service information storage section 73 of service management section 7 and managed by service information managing means 71, referring to the security policy managed by access control policy storage section 72 in response to a service access request from the user and granting access only to predetermined users, and certificate generation requesting means 80 for creating and sending a message for making a certificate generation request to the authentication apparatus with a certificate generation request token attached thereto based on the certificate generation request token and authentication apparatus information managed by service providing apparatus certificate management section 66.

Certificate management section 6 according to the second exemplary embodiment, as shown in FIG. 7, is provided with certificate generation request token acquiring means 61 for generating a random variable and managing the variable as a certificate generation request token related to a certificate, authentication apparatus information managing means 60 for managing authentication apparatus identifier information related to detailed information on authentication apparatus information in authentication apparatus information storage section 63, and certificate verifying means 62 for sending a distribution request of a certificate already generated to the authentication apparatus using a predetermined communication protocol based on the authentication apparatus information on the authentication apparatus information managing means, verifying the certificate distributed from the authentication apparatus, storing and managing the certificate in certificate information storage section 65 when the certificate is verified to be appropriate.

The object of the present invention will be accomplished by adopting the above described configuration, exchanging a certificate generation request token between the service mediating apparatus and the service providing apparatus, by the service providing apparatus which has received the certificate generation request token dynamically requesting the service providing apparatus for a new certificate with the certificate generation request token for the authentication apparatus using the certificate generation request token, by the authentication apparatus dynamically creating a certificate and distributing the certificate to the service providing apparatus.

Figure 18:
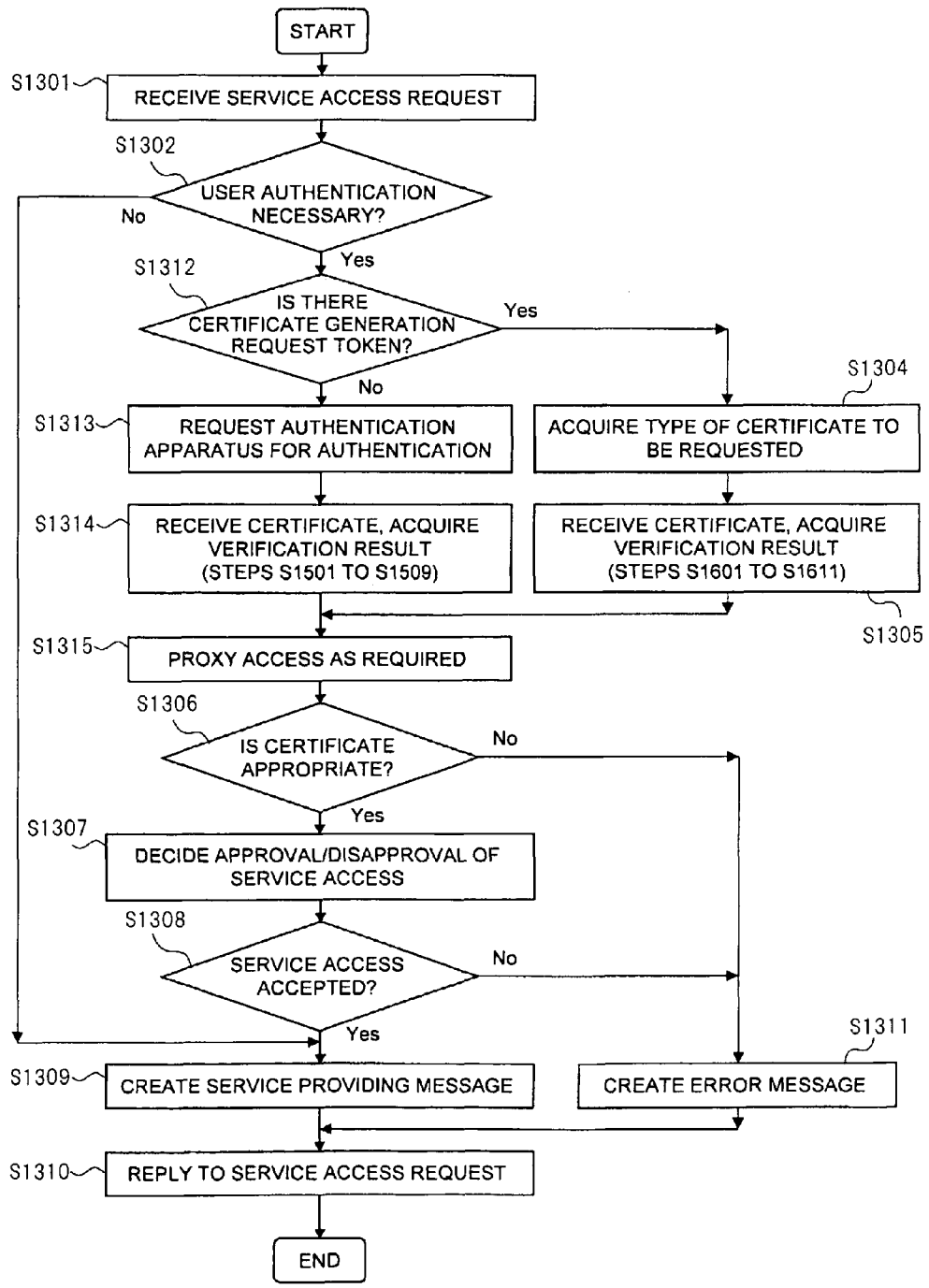
FIG. 18 is a flowchart illustrating an example of processing when the service mediating apparatus mediates a service request and further provides a service to another apparatus or a user.

Next, operations of the second exemplary embodiment will be described with reference to FIG. 18. FIG. 18 is a flowchart illustrating a processing example where service mediating apparatus 30 mediates a service request and further provides a service to another apparatus or a user. In the example shown in FIG. 18, processing in step S1312 is performed instead of step S1303 in FIG. 13, and processing in steps S1313, S1314 and S1315 is added. The processing in steps S1301, S1302, S1304 to S1310 in FIG. 18 is similar to the processing in exemplary embodiment 1 (see FIG. 13), and therefore descriptions thereof will be omitted.

In step S1312, certificate distribution requesting means 51 judges whether or not a certificate generation request token is included in the service access request message directed to service mediating apparatus 30. Upon judging that the certificate generation request token is included (Yes), certificate distribution requesting means 51 performs the same processing as that of service providing apparatus 3 of the first exemplary embodiment (steps S1304 and S1305) and moves to step S1315.

Upon judging in step S1312 that the certificate generation request token is not included (No), service mediating apparatus 30 sends an authentication request message to authentication apparatus 1 (step S1313). Service mediating apparatus 30 then performs the same processing as the processing of service mediating apparatus 2 shown in FIG. 15 (steps S1501 to S1509) and acquires a certificate (step S1314).

After acquiring the certificate, service management section 7 judges whether or not to execute proxy access and executes proxy access as required (step S1315). Processing in steps S1306 to S1310 is then executed.

In the second exemplary embodiment, the service providing apparatus (service mediating apparatus) can perform proxy access to another service providing apparatus. This makes it possible to repeatedly execute proxy access to the service and thereby reduce the amount of communication between the service providing apparatus and the authentication apparatus.

Third Exemplary Embodiment

Next, a third exemplary embodiment of the present invention will be described with reference to the accompanying drawings.

Figure 19:
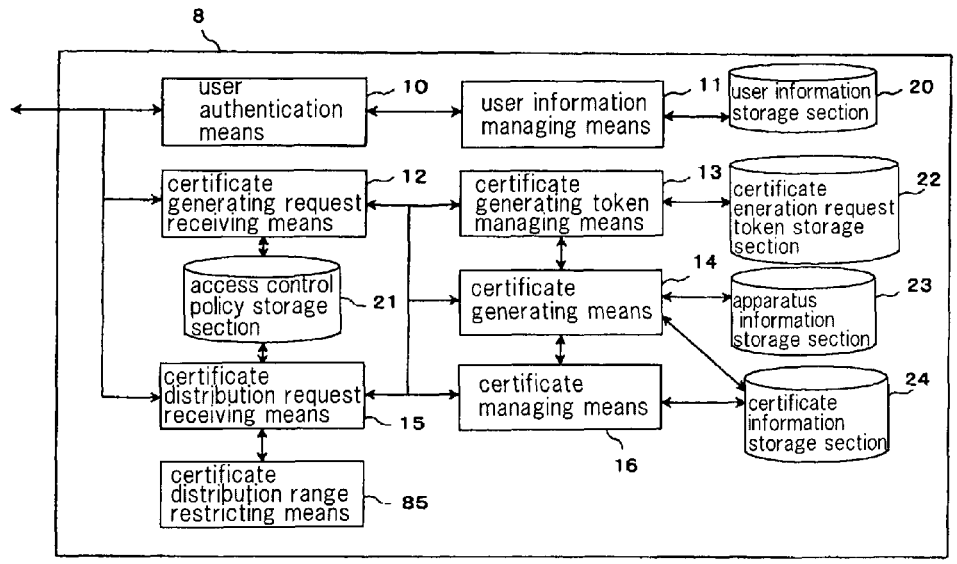
FIG. 19 is a block diagram illustrating a configuration example of an authentication apparatus according to a third exemplary embodiment.

FIG. 19 is a block diagram illustrating a configuration example of authentication apparatus 8 according to the third exemplary embodiment. As shown in FIG. 19, according to the third exemplary embodiment, authentication apparatus 8 includes certificate distribution range restricting means 85 in addition to the configuration of authentication apparatus 1 according to the first exemplary embodiment shown in FIG. 5.

Figure 20:
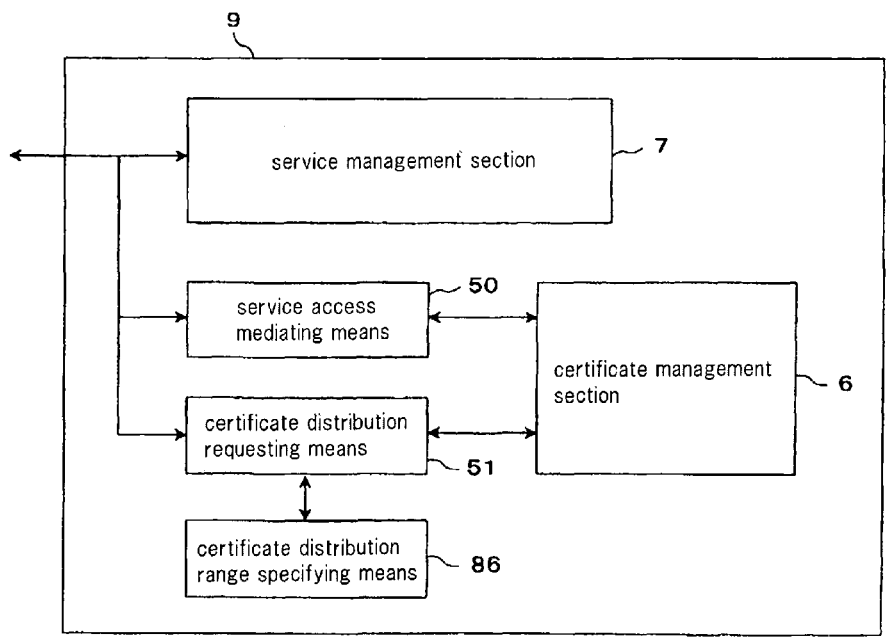
FIG. 20 is a block diagram illustrating a configuration example of a service mediating apparatus according to the third exemplary embodiment.

FIG. 20 is a block diagram illustrating a configuration example of service mediating apparatus 9 according to the third exemplary embodiment. As shown in FIG. 20, the third exemplary embodiment is different in that service mediating apparatus 9 includes service management section 7 and certificate distribution range specifying means 86 in addition to the configuration of service mediating apparatus 2 in the first exemplary embodiment shown in FIG. 6. The configuration of service management section 7 is similar to the configuration of exemplary embodiment 2 (see FIG. 17), and therefore descriptions thereof will be omitted.

Certificate distribution range specifying means 86 in service mediating apparatus 9 shown in FIG. 20 adds information for specifying a distribution range of a certificate to a certificate distribution request message transmitted to authentication apparatus 8 by certificate distribution requesting means 51. The information for specifying the distribution range of a certificate is, for example, a list of service providing apparatuses 3 to which a certificate generation request token to be sent back from authentication apparatus 8 is distributed and in which the certificate generation request token is valid.

In the third exemplary embodiment, certificate distribution request receiving means 15 receives a certificate distribution request message from service mediating apparatus 9. The certificate distribution request message includes information on a list of service providing apparatuses 3 for which a certificate can be newly generated and distributed.

Certificate distribution range restricting means 85 in authentication apparatus 8 shown in FIG. 19 judges whether or not there is any problem with creating and distributing a certificate in the list of service providing apparatuses 3 based on the list information of service providing apparatuses 3 specified in the certificate distribution request message. When it is judged that there is no problem, certificate distribution range restricting means 85 uses a certificate generation token newly generated so as to accept generation of a certificate only for service providing apparatus 3 included in the list of service providing apparatuses 3 when receiving a certificate generation request from service providing apparatus 3 thereafter. To be more specific, when certificate distribution request receiving means 15 receives the certificate distribution request, certificate distribution range restricting means 85 generates a policy of accepting the certificate generation request for service providing apparatus 3 included in the list and adds the policy to access control policy storage section 21.

Next, operations of the third exemplary embodiment will be described.

Figure 21:
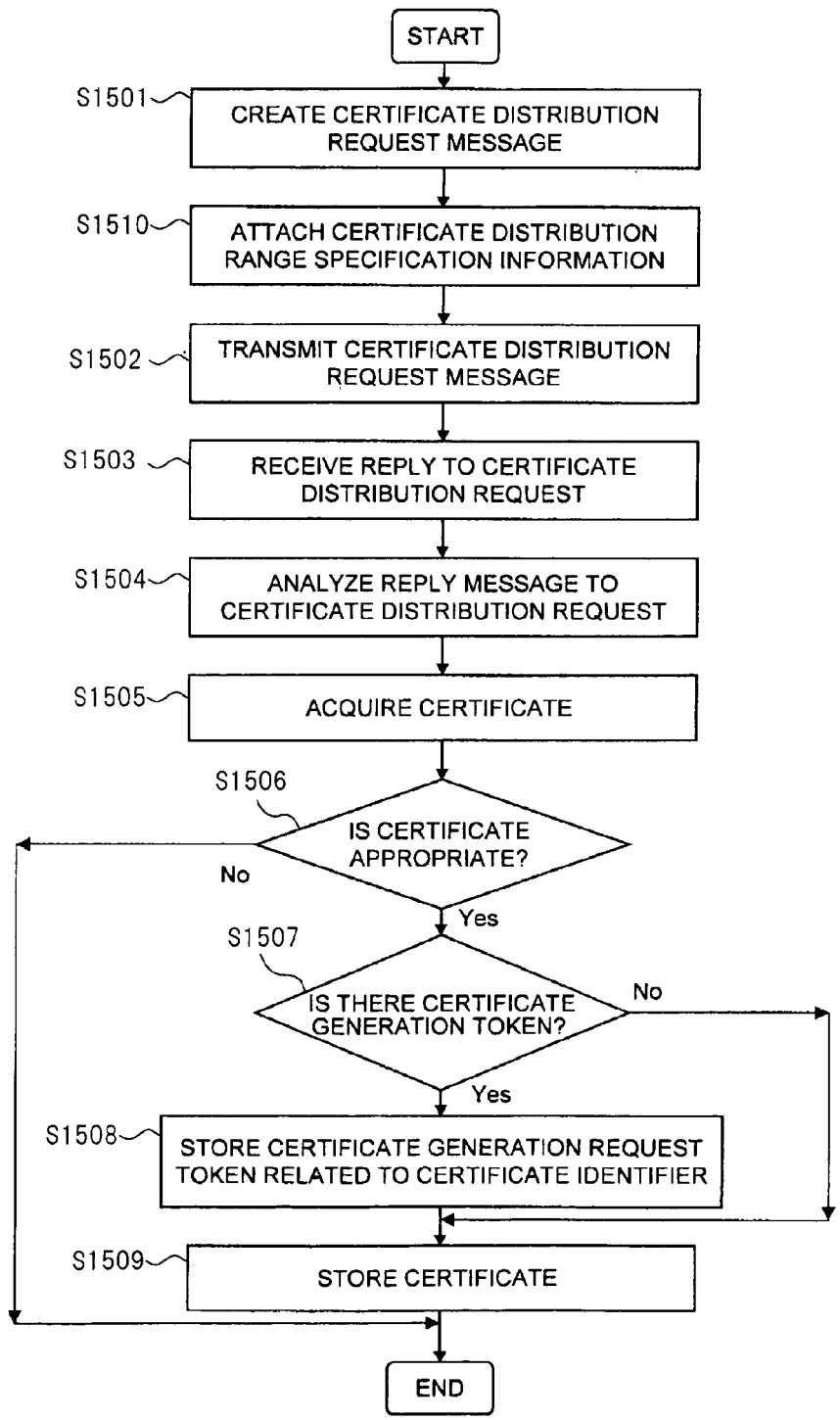
FIG. 21 is a flowchart illustrating a processing example when the service mediating apparatus makes a certificate distribution request to the authentication apparatus.

With reference to FIG. 21, processing when service mediating apparatus 9 makes a certificate distribution request to authentication apparatus 8 will be described. FIG. 21 is a flowchart illustrating a processing example where service mediating apparatus 9 makes a certificate distribution request to authentication apparatus 8. In the example shown in FIG. 21, processing in step S1510 is added between step S1501 and step S1502 in FIG. 15. The processing in steps S1501, S1502 to S1509 in FIG. 21 is similar to the processing in exemplary embodiment 1 (see FIG. 15), and therefore descriptions thereof will be omitted.

In step S1510, certificate distribution range specifying means 86 adds list information of service request apparatuses 3 to which a certificate may be considered distributable in response to the certificate distribution request message created by certificate distribution requesting means 51 in step S1501.

Figure 22:
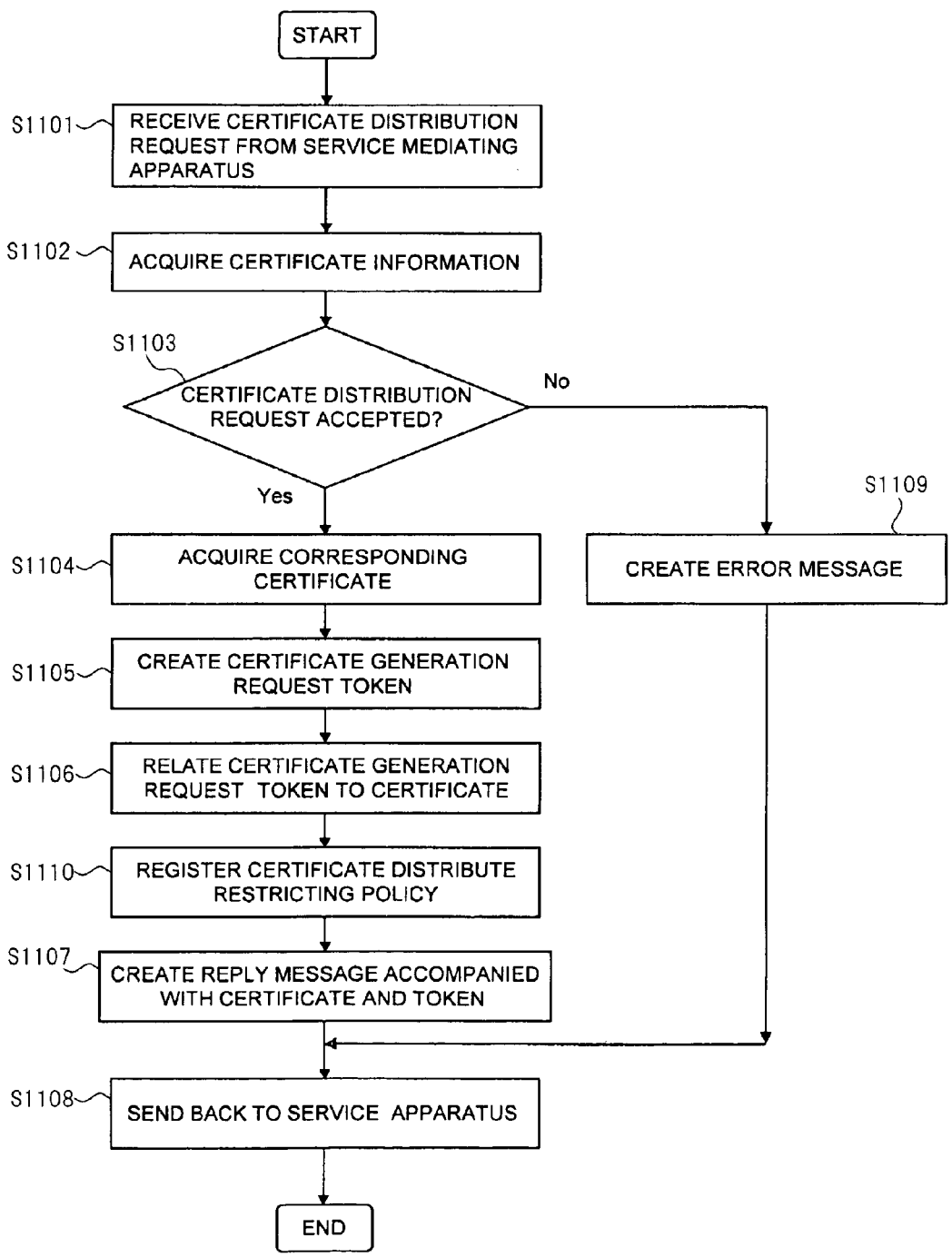
FIG. 22 is a flowchart illustrating a processing example when the authentication apparatus receives a certificate distribution request from the service mediating apparatus.

Next, processing when authentication apparatus 8 receives a certificate distribution request from service mediating apparatus 9 will be described with reference to FIG. 22. FIG. 22 is a flowchart illustrating a processing example when authentication apparatus 8 receives a certificate distribution request from service mediating apparatus 9.

In the example shown in FIG. 22, processing in step S1110 is added between step S1106 and step S1107 in FIG. 8. The processing in steps S1101 to S1106, S1107 to S1109 in FIG. 22 is similar to the processing in exemplary embodiment 1 (see FIG. 11), and therefore descriptions thereof will be omitted.

In step S1110, certificate distribution range restricting means 85 extracts the list information included in the certificate distribution request message received in step S1101. The list information is information illustrating service providing apparatuses 3 specified by service mediating apparatus 9 to which a newly generated certificate can be distributed.

Certificate distribution range restricting means 85 checks whether or not a certificate may be newly generated and distributed to service providing apparatuses 3 included in the extracted list, generates, when a certificate may be newly generated and distributed, a policy for accepting the certificate generation request and registers the policy with access control policy storage section 21. The policy generated by certificate distribution range restricting means 85 is a policy stating that a certificate generation request will be accepted upon receiving a certificate generation request regarding the certificate generation request token generated in step S1105 from service providing apparatus 3.

In the third exemplary embodiment, the service mediating apparatus specifies a range within which the certificate generation request token is valid. For example, the service mediating apparatus can specify a service providing apparatus that transmits a certificate. Accordingly, the authentication apparatus can limit the certificate distribution. This can strengthen preventive measures against leakage of certificate information.

Fourth Exemplary Embodiment

Next, a fourth exemplary embodiment of the present invention will be described with reference to the accompanying drawings.

Figure 23:
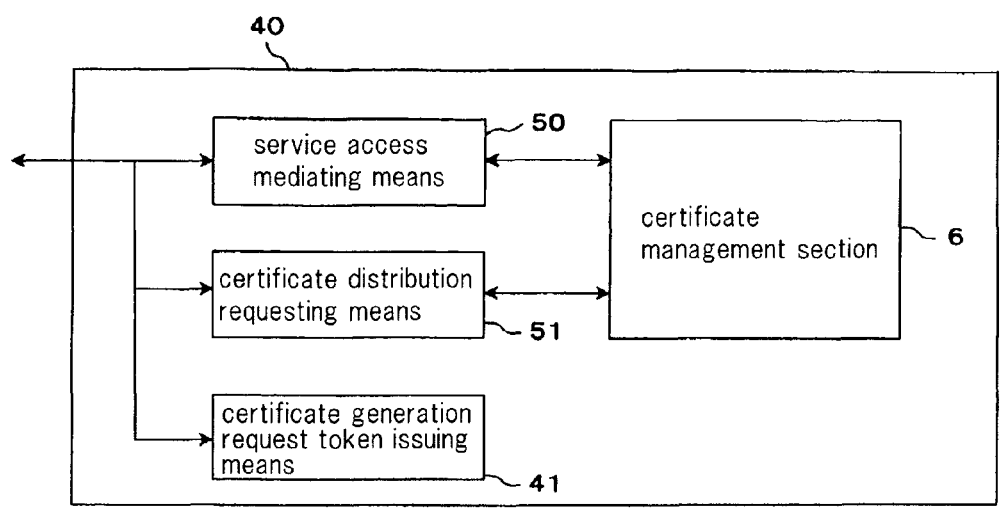
FIG. 23 is a block diagram illustrating a configuration example of a service mediating apparatus according to a fourth exemplary embodiment.

FIG. 23 is a block diagram illustrating a configuration example of service mediating apparatus 40 according to the fourth exemplary embodiment. As shown in FIG. 23, the fourth exemplary embodiment is different from the first exemplary embodiment in that service mediating apparatus 40 includes certificate generation request token issuing means 41 in addition to the configuration of service mediating apparatus 2 in the first exemplary embodiment shown in FIG. 6. Components similar to those in service mediating apparatus 2 of the first exemplary embodiment will be assigned the same reference numerals as those in FIG. 6 and descriptions thereof will be omitted.

Certificate generation request token issuing means 41 in service mediating apparatus 40 shown in FIG. 23 generates a token for authentication apparatus 1 to issue a certificate. The token issued by service mediating apparatus 40 has the same structure as that of a token issued by authentication apparatus 1 in the first exemplary embodiment.

Figure 24:
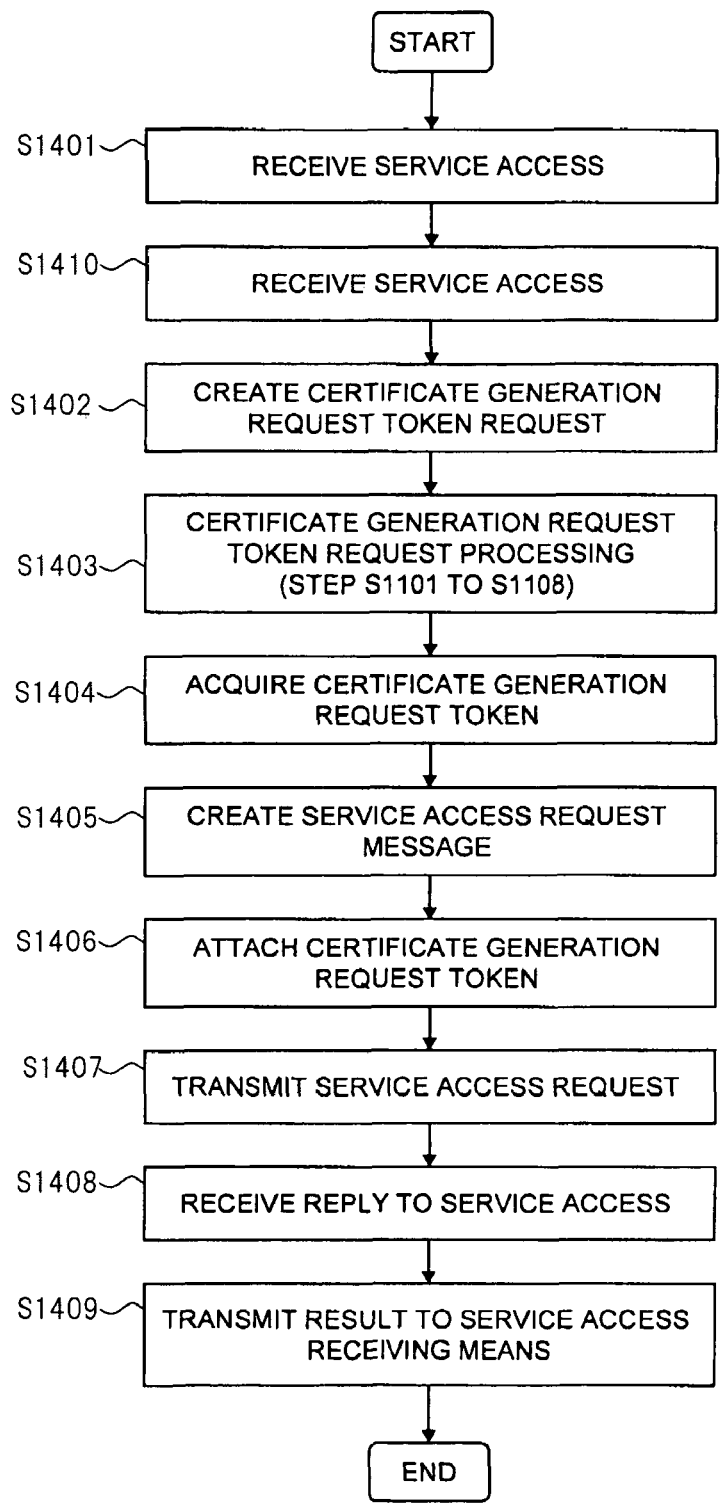
FIG. 24 is a flowchart illustrating a processing example when the service mediating apparatus makes a certificate distribution request to the authentication apparatus.

Next, operations of the fourth exemplary embodiment will be described with reference to FIG. 24. FIG. 24 is a flowchart illustrating a processing example when service mediating apparatus 40 makes a certificate distribution request to authentication apparatus 1. In the example shown in FIG. 24, processing in step S1410 is added between step S1401 and step S1402 in FIG. 14. The processing in steps S1401, S1402 to S1409 in FIG. 24 is similar to the processing in exemplary embodiment 1 (see FIG. 14), and therefore descriptions thereof will be omitted.

In step S1410, service mediating apparatus 40 issues a certificate generation request token. Next, in step S1402, when creating a message for requesting a certificate generation request token, service mediating apparatus 40 includes the certificate generation request token in the message created. Subsequent processing is the same as that of the operation in the first exemplary embodiment.

Figure 25:
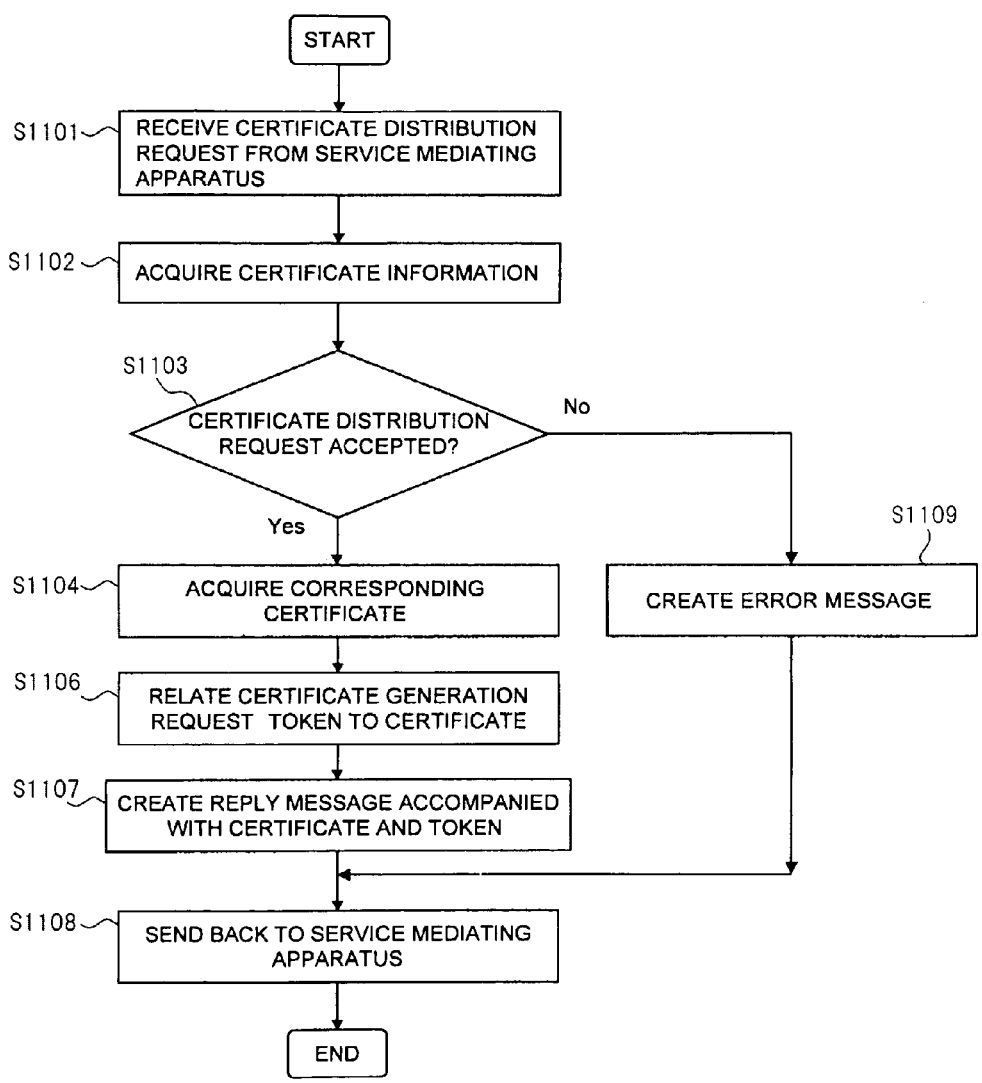
FIG. 25 is a flowchart illustrating a processing example when the authentication apparatus receives a certificate distribution request from the service mediating apparatus.

Next, the processing when authentication apparatus 1 receives a certificate distribution request from service mediating apparatus 40 will be described with reference to FIG. 25. FIG. 25 is a flowchart illustrating a processing example when authentication apparatus 1 receives a certificate distribution request from service mediating apparatus 40.

In the example shown in FIG. 25, the processing for creating a certificate generation request token (step S1105) between step S1104 and step S1106 in FIG. 11 is deleted. Authentication apparatus 1 itself does not issue a certificate generation request token but uses a certificate generation request token transmitted from service mediating apparatus 40. The processing from the processing of relating the certificate generation request token to the certificate (step S1106) onward is the same as the operation in the first exemplary embodiment.

In the fourth exemplary embodiment, the certificate generation request token issuing function can be moved from authentication apparatus 1 to service mediating apparatus 40. This can alleviate the burden on the message processing by authentication apparatus 1.

Example 1

Next, a first example of the present invention will be described with reference to the accompanying drawings. Such an example corresponds to the second exemplary embodiment of the present invention.

Figures 26, 27:
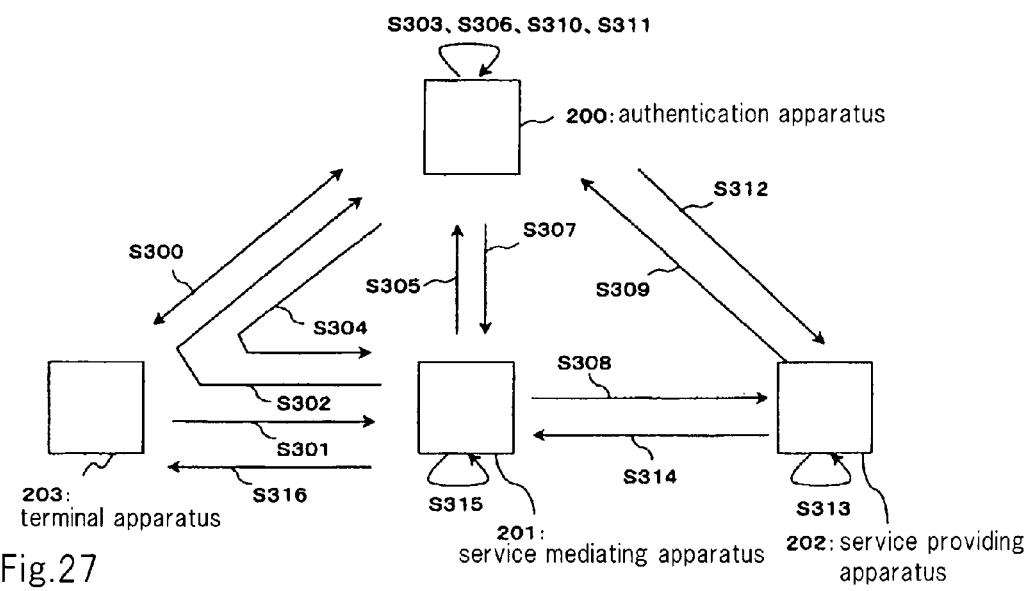
FIG. 26 illustrates a first example of the certificate generating/distributing system according to the present invention.
FIG. 27 illustrates a registration example of an account correspondence management table.

FIG. 26 illustrates the first example of the certificate generating/distributing system of the present invention. The certificate generating/distributing system shown in FIG. 26 is provided with authentication apparatus 200, service mediating apparatus 201, service providing apparatus 202 and terminal apparatus 203. Authentication apparatus 200, service mediating apparatus 201, service providing apparatus 202 and terminal apparatus 203 are each provided with the functions shown in the second exemplary embodiment.

In the first example, authentication apparatus 200 releases an authentication service to predetermined users on the Internet. Service mediating apparatus 201 releases a service as a tour portal site to predetermined users. Service providing apparatus 202 releases a service such as a rent-a-car reservation site to predetermined users. Terminal apparatus 203 has a general-purpose Web browser function and is operated by a user. Authentication apparatus 200, service mediating apparatus 201, service providing apparatus 202 and terminal apparatus 203 are each connected to a communication network such as the Internet.

Service mediating apparatus 201 is an apparatus that realizes a site capable of making a batch reservation for a package tour on behalf of users. Service mediating apparatus 201 accesses service providing apparatus 202, which is an apparatus that realizes an affiliated rent-a-car reservation site according to a tour reservation request from a user and makes a rent-a-car reservation for the user as a proxy of the user as required.

Authentication apparatus 200, service mediating apparatus 201, service providing apparatus 202 and terminal apparatus 203 are all provided with a function of communicating with each other according to a communication protocol defined, for example, by HTTP (Hyper Text Transport Protocol).

User Alice became a member of communication providers who manage authentication apparatus 200 beforehand and possesses an account (account name is Alice200). Furthermore, Alice is also a member of the tour portal site and the rent-a-car reservation site and has the respective accounts (account names are aabbcc and xxyyzz). Both accounts on the tour portal site and the rent-a-car reservation site are each managed in relation to the account of the communication provider.

FIG. 27 illustrates an example of registration of an account correspondence management table managed by user information managing means 11 of authentication apparatus 200. FIG. 27 illustrates an example of the correspondence management table of an account name (anonym) for each apparatus regarding Alice. In the example shown in FIG. 27, account names (anonyms) of Alice managed by the respective apparatuses are managed in relation to the apparatus names.

In the beginning, Alice is not authenticated by authentication apparatus 200 and no session regarding Alice is established in authentication apparatus 200, service mediating apparatus 201 and service providing apparatus 202.

Figure 28:
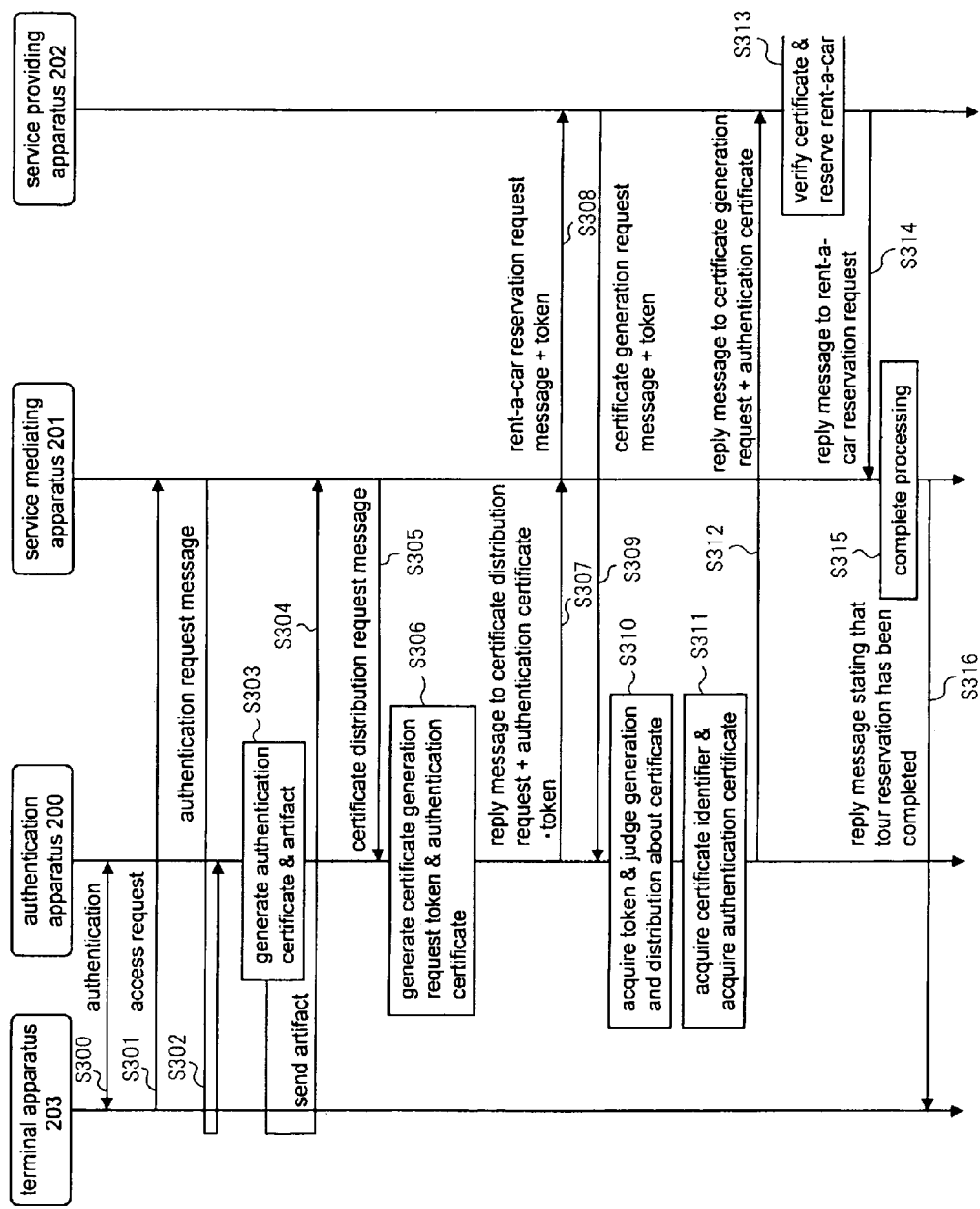
FIG. 28 is a sequence diagram illustrating an operation example of the certificate generating/distributing system of the first example.

FIG. 28 is a sequence diagram illustrating an operation example of the certificate generating/distributing system in the first example. Hereinafter, operations of the certificate generating/distributing system in the first example will be described with reference to FIG. 26 and FIG. 28.

Alice accesses authentication apparatus 200 of the communication provider using terminal apparatus 203 and receives authentication (step S300). After the authentication of Alice, authentication apparatus 200 establishes a session for Alice, sends information corresponding to the identifier of the session (e.g., session cookie) to terminal apparatus 203 of Alice and terminal apparatus 203 receives the session identifier information.

Next, Alice sends a service access request for a tour reservation to service mediating apparatus 201 of the tour portal site (step S301). Service mediating apparatus 201 receives the service access request from terminal apparatus 203 and sends an authentication request message for asking authentication apparatus 200 for authentication of the user (step S302). Regarding the authentication request, for example, a method using an artifact profile of SAML described in Non-Patent Document 1 is adopted. The authentication request message is sent to authentication apparatus 200 via terminal apparatus 203 of Alice.

Authentication apparatus 200, which has received the authentication request, confirms from the session that Alice has already been authenticated and generates an authentication certificate indicating that authentication regarding Alice has been completed, and an artifact corresponding to the authentication certificate (step S303). Authentication apparatus 200 then sends the artifact back to service mediating apparatus 201 via terminal apparatus 203 (step S304).

FIG. 29 illustrates an example of description contents of the authentication certificate. The authentication certificate illustrated in FIG. 29 includes an anonym (aabbcc) regarding Alice used in service mediating apparatus 201. Furthermore, the valid range within which the certificate is distributed is defined only in service mediating apparatus 201.

Service mediating apparatus 201, which has received the artifact, creates a certificate distribution request message accompanied with the artifact and sends the certificate distribution request message to authentication apparatus 200 (step S305).

Authentication apparatus 200, which has received the certificate distribution request, acquires (extracts) the authentication certificate regarding Alice based on the artifact. Authentication apparatus 200 creates an authentication certificate and a certificate generation request token for service providing apparatus 202, and manages the authentication certificate in relation to the certificate generation request token (step S306). Next, authentication apparatus 200 creates a reply message to the certificate distribution request accompanied with the authentication certificate and the certificate generation request token and sends the reply message back to service mediating apparatus 201 (step S307).

FIG. 30 illustrates an example of the reply message to the certificate distribution request. In the authentication certificate illustrated in FIG. 30, a SOAP (Simple Object Access Protocol) Header section stores a certificate generation request token in a <cert-req-token> tag according to a protocol of SOAP on HTTP. Furthermore, the SOAP Body section stores an authentication certificate illustrated in FIG. 29 in correspondence with the SAML Response protocol under a <Response> tag.

Furthermore, FIG. 31 illustrates an example of a correspondence management table of certificate generation tokens and authentication certificate identifiers managed by certificate generation request token managing means 13 of authentication apparatus 200. Certificate generation request token managing means 13 manages certificate generation request tokens in relation to identifiers of authentication certificates and user identifiers as the correspondence management table illustrated in FIG. 31 in a database of certificate generation request token storage section 22.

FIG. 32 illustrates an example of the authentication certificate for service providing apparatus 202. Compared to the authentication certificate illustrated in FIG. 29, the authentication certificate for service providing apparatus 202 is the same in that the authentication certificate is generated by authentication apparatus 200 regarding user Alice to certify the authentication result information of Alice, but differs in description contents. For example, the authentication certificate illustrated in FIG. 32 is different in that the anonym (xxyyzz) of Alice is used as the user information in service providing apparatus 202 and the range of distribution of the authentication certificate is defined only for service providing apparatus 202.

Service mediating apparatus 201, which has received the authentication certificate and the certificate generation request token, verifies and stores the authentication certificate.

Next, service mediating apparatus 201 creates a rent-a-car reservation request message for service providing apparatus 202 and sends the message with the certificate generation request token attached thereto (step S308).

FIG. 33 illustrates an example of the rent-a-car reservation request message. In the rent-a-car reservation request message, the SOAP Header section stores the certificate generation request token based on SOAP on HTTP and the SOAP Body section describes detailed information on the rent-a-car reservation.

Service providing apparatus 202, which has received the rent-a-car reservation request message, extracts and analyzes the certificate generation request token. Service providing apparatus 202 then confirms that the token is the certificate generation request token issued by authentication apparatus 200. Furthermore, since the rent-a-car reservation requires the authentication certificate of the user, a certificate generation request message regarding the authentication certificate of the user is created and sent with the certificate generation request token attached thereto to authentication apparatus 200 (step S309).

Figures 34, 35:
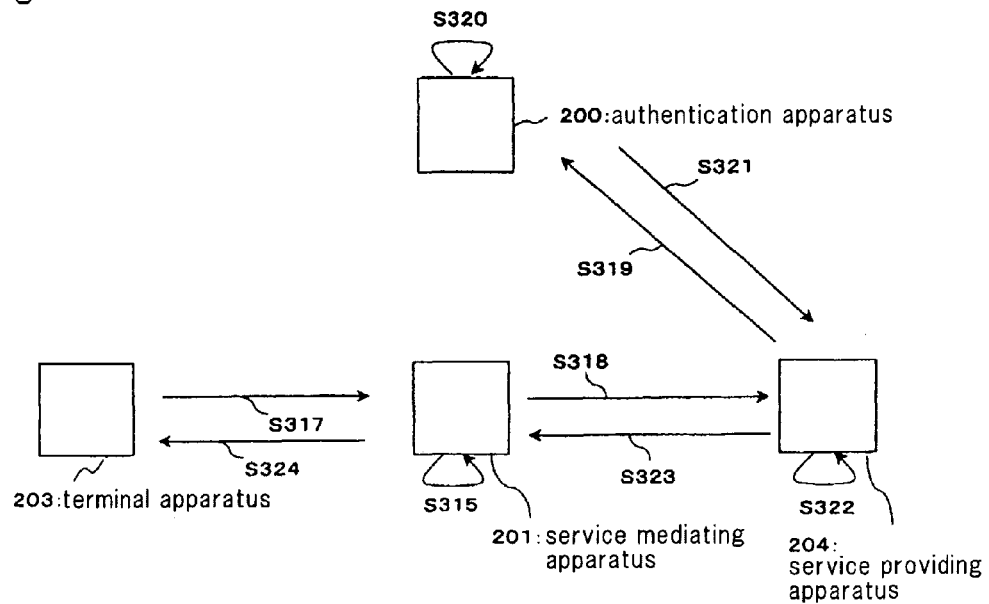
FIG. 34 illustrates an example of a certificate generation request message.
FIG. 35 illustrates a second example of the certificate generating/distributing system according to the present invention.

FIG. 34 illustrates an example of the certificate generation request message. The certificate generation request message is a message using SOAP on HTTP, and the SOAP Header section stores the certificate generation request token and the SOAP Body section describes details of the certificate generation request such as the type (here, authentication certificate) of the requested certificate.

Authentication apparatus 200, which has received the certificate generation request message, acquires (extracts) the attached certificate generation request token. Authentication apparatus 200 then refers to the security policy managed for service providing apparatus 202 and makes an approval/disapproval decision on the distribution of the authentication certificate regarding the user (step S310).

Next, authentication apparatus 200 analyzes the contents of the certificate generation request token, acquires (extracts) the certificate identifier related to the certificate generation request token and acquires information illustrating user Alice described in the certificate and the authentication certificate for service providing apparatus 202 corresponding to the certificate generation request token (step S311).

Next, authentication apparatus 200 creates a reply message to the certificate generation request with the authentication certificate for service providing apparatus 202 attached thereto and sends the reply message to service providing apparatus 202 (step S312).

Service providing apparatus 202, which has received the certificate, verifies the certificate, confirms from the information described that Alice has been authenticated and makes an approval/disapproval decision on the action of the rent-a-car reservation for Alice. As a result of the approval/disapproval decision, if the action can be accepted, a predetermined rent-a-car reservation for Alice is made (step S313). Service providing apparatus 202 then creates a reply message to the rent-a-car reservation request and sends the reply message to service mediating apparatus 201 (step S314).

Service mediating apparatus 201, which has received the rent-a-car reservation reply message, checks the rent-a-car reservation information and completes all the processing on the tour reservation for Alice (step S315). Service mediating apparatus 201 then creates a reply message stating that the tour reservation has been completed and sends the reply message to terminal apparatus 203 of Alice (step S316).

Example 2

Next, a second example of the present invention will be described with reference to the accompanying drawings. Such an example corresponds to the first exemplary embodiment of the present invention.

FIG. 35 illustrates the second example of the certificate generating/distributing system according to the present invention. The certificate generating/distributing system shown in FIG. 35 is provided with authentication apparatus 200, service mediating apparatus 201, service providing apparatus 204 and terminal apparatus 203. Authentication apparatus 200, service mediating apparatus 201, service providing apparatus 204 and terminal apparatus 203 each include the functions in the first exemplary embodiment.

In the second example, as shown in FIG. 35, service providing apparatus 204 that establishes a purchase service on the Internet as a purchase site is added instead of the rent-a-car site (service providing apparatus 202) in the configuration of the first example (see FIG. 26).

The purchase site (service providing apparatus 204) does not manage user information and asks the tour portal site (service mediating apparatus 201) in the first example to act as an agent to perform the billing processing. When an attribute certificate describing predetermined attribute information regarding the user distributed by authentication apparatus 200 is available, the purchase site can receive the purchase request from the tour portal site. Service providing apparatus 204 of the purchase site is also provided with an HTTP compatible communication function.

After completion of step S316 of the first example, that is, in a state in which Alice has already been authenticated by authentication apparatus 200 and a session has been established, Alice makes a purchase request for tour-related goods to service mediating apparatus 201 of the tour portal using terminal apparatus 203 (step S317).

Service mediating apparatus 201, which has received the purchase request, extracts the certificate generation request token regarding Alice received and stored in step S307 of the first example, creates a purchase request message for the tour-related goods to service providing apparatus 204 on the purchase site and sends the purchase request message with the certificate generation request token attached thereto to service providing apparatus 204 (step S318).

Service providing apparatus 204, which has received the purchase request message, acquires the certificate generation request token included in the received message. Service providing apparatus 204 then creates a generation request message of an attribute certificate of the user related to the certificate generation request token and sends the message with the certificate generation request token attached thereto to authentication apparatus 200 (step S319).

For example, in the present example, the zip code, age and solvency are defined as the attribute information to be described in the attribute certificate to be requested. FIG. 36 illustrates an example of the generation request message for the attribute certificate. The generation request message is a message using SOAP of HTTP and the SOAP Body section defines the attribute certificate of the user as a type of certificate whose generation is requested, and zip code (zip-code), age (age), solvency (rate-for-payment) as the type of attribute information requested.

Authentication apparatus 200 receives the certificate generation request, acquires and analyzes the certificate generation request token. Authentication apparatus 200 then acquires the authentication certificate of Alice related to the certificate generation request token and newly generates an attribute certificate regarding Alice including the zip code, age and solvency (step S320).

Authentication apparatus 200 then sends the attribute certificate back to service providing apparatus 204 (step S321). FIG. 37 illustrates an example of the attribute certificate. The attribute certificate describes the attribute information on the zip code (zip-code), age (age), solvency (rate-for-payment) of user Alice, but does not describe the authentication information of user Alice or enough information to identify Alice.

Service providing apparatus 204, which has received the attribute certificate, verifies the attribute certificate, checks the information described in the attribute certificate and makes an approval/disapproval decision as to whether or not to accept the purchase request (step S322). When the purchase request is accepted, service providing apparatus 204 performs purchase processing on the requested tour-related goods and sends the result back to service mediating apparatus 201 (step S323).

Service mediating apparatus 201, which has received the result information on the purchase request, checks the contents, creates a reply message to the purchase request from Alice in step S317 and sends the reply message (step S324).

The billing information will then be exchanged between service mediating apparatus 201 and service providing apparatus 204, but the description thereof will be omitted here.

Example 3

Next, a third example of the present invention will be described with reference to the accompanying drawings. Such an example corresponds to the first exemplary embodiment of the present invention.

Figure 38:
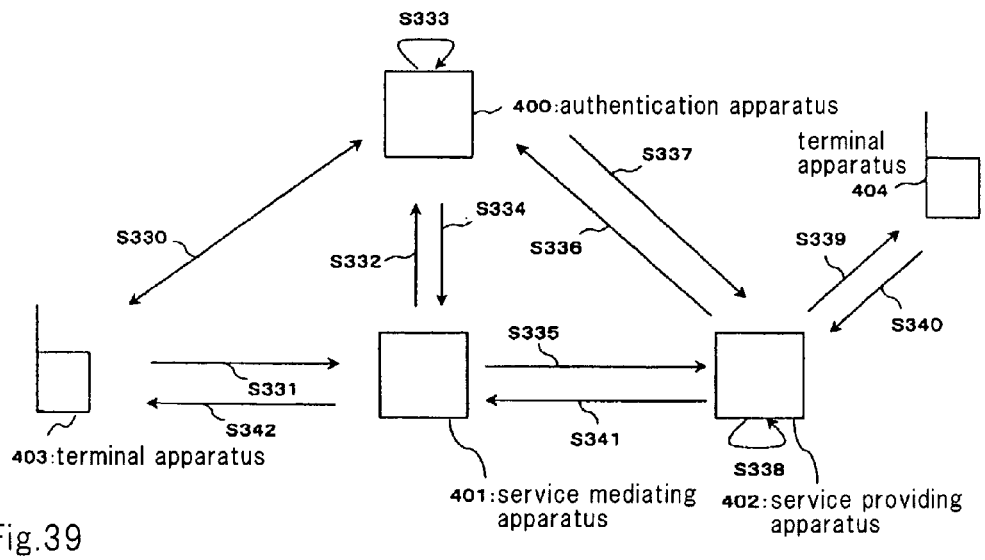
FIG. 38 illustrates a third example of the certificate generating/distributing system according to the present invention.

FIG. 38 illustrates the third example of the certificate generating/distributing system according to the present invention. The certificate generating/distributing system shown in FIG. 38 is provided with authentication apparatus 400, service mediating apparatus 401, service providing apparatus 402, terminal apparatus 403 and terminal apparatus 404. Authentication apparatus 400, service mediating apparatus 401, service providing apparatus 402, terminal apparatus 403 and terminal apparatus 404 each include the functions of the first example and can communicate with each other according to SIP (Session Initiation Protocol).

Service mediating apparatus 401 is provided with a function of SIP proxy. Furthermore, authentication apparatus 400 and service providing apparatus 402 are provided with a function of SIP server. Both terminal apparatus 403 and terminal apparatus 404 are portable terminals that can transmit/receive a SIP message. Both users Alice and Bob possess accounts in a communication carrier run by authentication apparatus 400 and can carry out VoIP (Voice over IP) communication compliant with SIP using terminal apparatus 403 and terminal apparatus 404 respectively.

Alice receives authentication from authentication apparatus 400 using a predetermined authentication scheme by operating terminal apparatus 403 (step S330). In this case, authentication apparatus 400 generates session information and an authentication certificate regarding Alice. Next, Alice sends a SIP INVITE message to service mediating apparatus 401 using terminal apparatus 403 in an attempt to call Bob using VoIP (step S331).

Next, service mediating apparatus 401, which has received the SIP INVITE message, makes a distribution request of the authentication certificate regarding the user to authentication apparatus 400 using a predetermined communication protocol to check the authentication state of the user related to the SIP INVITE message (step S332). For example, the identifier information of terminal apparatus 403 is stored in the message of the certificate distribution request.

Authentication apparatus 400, which has received the certificate distribution request, checks the identifier information of terminal apparatus 403, confirms, based on the terminal identifier information, that the authentication request is related to Alice and checks the session information and authentication certificate of Alice. Next, authentication apparatus 400 generates a certificate generation request token, manages the certificate generation request token related to the authentication certificate of Alice (step S333), and sends the certificate generation request token accompanied with the certificate generation request token and authentication certificate back to service mediating apparatus 401 (step S334).

Service mediating apparatus 401, which has received the reply to the certificate generation request, acquires the certificate generation request token, creates a new SIP INVITE message to service providing apparatus 402 and sends the SIP INVITE message with the certificate generation request token attached thereto to service providing apparatus 402 (step S335).

Service providing apparatus 402, which has received the SIP INVITE message from service mediating apparatus 401, creates a certificate generation request message of the authentication certificate with the received certificate generation request token attached thereto and sends the certificate generation request message to authentication apparatus 400 (step S336).

Authentication apparatus 400, which has received the certificate generation request message, acquires the certificate generation request token and confirms that the request is the generation request for the authentication certificate regarding Alice. Authentication apparatus 400 then generates an authentication certificate regarding Alice and sends the authentication certificate back to service providing apparatus 402 (step S337).

Service providing apparatus 402, which has received the response message to the certificate generation request, acquires and verifies the authentication certificate and confirms that the response message is the request from user Alice. Service providing apparatus 402 then checks the security policy including the contract state of Alice or the like and makes an approval/disapproval decision on forwarding the SIP INVITE to Bob (step S338). Next, service providing apparatus 402 creates a SIP INVITE message from Alice to Bob and sends the SIP INVITE message back to terminal apparatus 404 of Bob (step S339).

Bob who has received the SIP INVITE message from service providing apparatus 402 at terminal apparatus 404 reacts to the call shown by terminal apparatus 404 and accepts the call. Here, terminal apparatus 404 sends ACK as a reply to the SIP INVITE message (step S340).

Service providing apparatus 402 receives ACK from terminal apparatus 404 and sends ACK back to service mediating apparatus 401 (step S341). Furthermore, service mediating apparatus 401 sends ACK back to terminal apparatus 403 of Alice (step S342). Alice can start a call with Bob through the above described processing.

Example 4

Next, a fourth example of the present invention will be described with reference to the accompanying drawings. Such an example corresponds to the second exemplary embodiment of the present invention.

Figure 39:
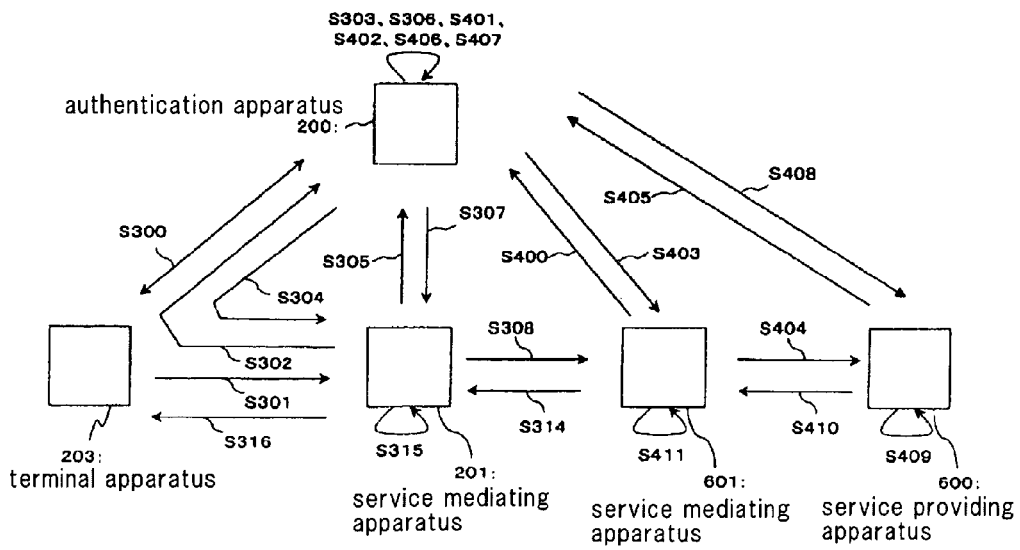
FIG. 39 illustrates a fourth example of the certificate generating/distributing system according to the present invention.

FIG. 39 illustrates the fourth example of the certificate generating/distributing system according to the present invention. The certificate generating/distributing system shown in FIG. 39 is provided with authentication apparatus 200, service mediating apparatus 201, terminal apparatus 203, service mediating apparatus 601 and service providing apparatus 600. Authentication apparatus 200, service mediating apparatus 201, terminal apparatus 203, service mediating apparatus 601 and service providing apparatus 600 each include the functions of the second exemplary embodiment.

In the fourth exemplary embodiment shown in FIG. 39, service mediating apparatus 601 that provides a rent-a-car reservation site and service providing apparatus 600 that provides an automobile insurance service are connected via a communication network such as the Internet in addition to the configuration of the first example (see FIG. 26). Service mediating apparatus 601 corresponds to service providing apparatus 202 according to the first example.

Service providing apparatus 600 provides automobile insurance for the user in response to an automobile insurance service request from the rent-a-car reservation site (service mediating apparatus 601).

Furthermore, service mediating apparatus 601 which is the rent-a-car reservation site in the fourth example also has a function of mediating a service for requesting automobile insurance on behalf of users in addition to the function of service providing apparatus 202 of the first example. The rent-a-car reservation site (service mediating apparatus 601) in the fourth example accesses automobile insurance site (service providing apparatus 600) before completing the rent-a-car reservation processing, performs processing of taking out automobile insurance, completes rent-a-car reservation processing and notifies this to the user.

Authentication apparatus 200 that releases the authentication service to predetermined users, service mediating apparatus 201 that releases the service as the tour portal site to predetermined users and terminal apparatus 203 of the user having a function of a general-purpose Web browser have the same functions as those of the first example. All the apparatuses are provided with the function of communicating with each other using a communication protocol defined by HTTP (Hyper Text Transport Protocol).

User Alice became a member of the communication provider who manages authentication apparatus 200 beforehand and possesses an account (account name is Alice200). Furthermore, Alice is also a member of the tour portal site, rent-a-car reservation site and automobile insurance site and possesses the respective accounts (account names are Alice201, Alice601, Alice600). The respective accounts on the tour portal site, rent-a-car reservation site and automobile insurance site are managed in relation to the account of the communication provider.

FIG. 40 illustrates a registration example of an account correspondence management table managed by user information managing means 11 of authentication apparatus 200. FIG. 40 illustrates an example of the correspondence management table of an account name (anonym) for each apparatus regarding Alice. In the example shown in FIG. 40, the account names (anonyms) of Alice managed in the respective apparatuses are managed in relation to with the apparatus names.

In the beginning, Alice is not authenticated by authentication apparatus 200, no session regarding Alice is established in authentication apparatus 200, service mediating apparatus 201, service mediating apparatus 601 and service providing apparatus 600. The same processing as that in step S300 to step S308 in the first example is performed after this condition until the rent-a-car reservation site (service mediating apparatus 601) acquires the certificate generation request token from service mediating apparatus 201. Hereinafter, processing from step S308 onward will be described.

In step S308, when service mediating apparatus 601 that runs the rent-a-car reservation site acquires a certificate generation request token from service mediating apparatus 201, service mediating apparatus 601 in the fourth example accesses service providing apparatus 600 running the automobile insurance site instead of sending back a service response. First, service mediating apparatus 601 creates a certificate distribution request message with the certificate generation request token (for service mediating apparatus 601) attached thereto and sends the certificate distribution request message to authentication apparatus 200 (step S400).

Authentication apparatus 200, which has received the certificate generation request, acquires (extracts) the attached certificate generation request token. Authentication apparatus 200 then refers to the security policy managed for service mediating apparatus 601 and makes an approval/disapproval decision on the distribution of the authentication certificate regarding the user (step S401).

Next, authentication apparatus 200 analyzes the contents of the certificate generation request token, acquires (extracts) the certificate identifier related to the certificate generation request token and acquires information illustrating user Alice described in the certificate based on the authentication result information.

Authentication apparatus 200 newly generates an authentication certificate regarding Alice (for service mediating apparatus 601) resulting from updating the user identifier (xxyyzz in the example shown in FIG. 40) of Alice related to service mediating apparatus 601 and the information on the distribution range of the certificate (service mediating apparatus 601 in this example) based on the information described in the certificate.

Furthermore, authentication apparatus 200 newly issues an authentication certificate for service providing apparatus 600 based on the authentication certificate (for service mediating apparatus 601), generates a certificate request token (for service providing apparatus 600) related to the authentication certificate and manages the certificate request token related to therewith (step S402).

Next, authentication apparatus 200 creates a reply message to the certificate distribution request accompanied with the authentication certificate (for service mediating apparatus 601) and certificate generation request token (for service providing apparatus 600) and sends the reply message back to service mediating apparatus 601 (step S403).

Service mediating apparatus 601, which has received the authentication certificate and certificate generation request token, verifies and stores the authentication certificate. Next, service mediating apparatus 601 creates an automobile insurance subscription request message for service providing apparatus 600 and sends the automobile insurance subscription request message with the certificate generation request token (for service providing apparatus 600) attached to service providing apparatus 600 (step S404).

Service providing apparatus 600, which has received the automobile insurance subscription request, extracts and analyzes the certificate generation request token. Service providing apparatus 600 then confirms that the token is the certificate generation request token issued by authentication apparatus 200. Since taking out automobile insurance requires an authentication certificate (for service providing apparatus 600) of the user, service providing apparatus 600 creates a certificate generation request message regarding the authentication certificate of the user and sends the certificate generation request message with the certificate generation request token (for service providing apparatus 600) attached to authentication apparatus 200 (step S405).

Authentication apparatus 200, which has received the certificate generation request message, acquires the attached certificate generation request token, refers to the security policy managed for service providing apparatus 600 and makes an approval/disapproval decision on the generation and distribution of the authentication certificate regarding the user (step S406).

Next, authentication apparatus 200 analyzes the contents of the certificate generation request token, acquires (extracts) the certificate identifier related to the certificate generation request token and acquires information indicating user Alice described in the certificate based on the authentication result information thereof.

Authentication apparatus 200 then acquires a user identifier (corresponding to "qwerty" in the example shown in FIG. 40) related to service providing apparatus 600 and an authentication certificate (for service providing apparatus 600) regarding Alice, which is updated information on the distribution range of the certificate (corresponding to service providing apparatus 600 in this example) based on the information described in the certificate (step S407).

Next, authentication apparatus 200 creates a reply message to the certificate generation request accompanied with the authentication certificate for service providing apparatus 600 and sends the reply message to service providing apparatus 600 (step S408).

Service providing apparatus 600, which has received the certificate, verifies the certificate, confirms from the information described that Alice has been authenticated and makes an approval/disapproval decision on the action of taking out automobile insurance for Alice. When the result of the approval/disapproval decision shows that the action is acceptable, service providing apparatus 600 executes an automobile insurance subscription procedure for Alice (step S409). Service providing apparatus 600 then creates a reply message to the automobile insurance subscription request and sends the reply message to service mediating apparatus 601 (step S410).

Service mediating apparatus 601, which has received the automobile insurance subscription response message, verifies the certificate acquired in step S404, confirms from the information described that Alice has been authenticated and makes an approval/disapproval decision on the action of a rent-a-car reservation for Alice. When the result of the approval/disapproval decision shows that the action is acceptable, service mediating apparatus 601 makes a predetermined rent-a-car reservation for Alice (step S411). The subsequent processing is similar to the processing in steps S314 to S316 in the first example.

Hereinafter, effects of the present invention will be described. A first effect is that it is possible to improve the efficiency of communication between the apparatuses carried out for the creation and distribution of a certificate. This is because a certificate can be created and distributed from the service apparatus to the authentication apparatus through simple processing without any user agent.

A second effect is that leakage of confidential information can be prevented. This is because a certificate generation/distribution request token itself, which is exchanged between the service apparatuses includes no information to identify the user.

A third effect is that the authentication apparatus can prevent leakage of information described in the certificate. This is because the authentication apparatus strictly defines the valid range of the certificate, and can generate and distribute a certificate so that the valid range described in the certificate matches the service providing apparatus which provides a service to be distributed.

A fourth effect is that the authentication apparatus can audit a service providing apparatus that distributes a certificate. This is because the authentication apparatus can keep track of and record all service providing apparatuses that distribute certificates. Auditing a service providing apparatus means executing processing for managing an access log for the service providing apparatus and confirming that there is no illegal access to the service providing apparatus.

The above described exemplary embodiments have presented the certificate generating/distributing system provided with a characteristic configuration as shown in (1) to (5) below.

(1) The certificate generating/distributing system is a certificate generating/distributing system provided with an authentication apparatus that authenticates a user, a service providing apparatus that provides a service and a service mediating apparatus that mediates service provision by the service providing apparatus, wherein the authentication apparatus includes token transmitting means (e.g., realized by certificate distribution request receiving means 15) for transmitting, to the service mediating apparatus, a certificate generation request token, which is information corresponding to a first certificate valid in the service mediating apparatus, together with the first certificate, the service mediating apparatus including mediating apparatus token forwarding means (e.g., realized by service access mediating means 50) for forwarding the certificate generation request token received from the token transmitting means to the service providing apparatus, the service providing apparatus including certificate requesting means (e.g., realized by certificate generation requesting means 80) for transmitting the certificate generation request token received from the mediating apparatus token forwarding means to the authentication apparatus when requesting a second certificate valid in the service providing apparatus, and the authentication apparatus including certificate transmitting means (e.g., realized by certificate generation request receiving means 12) for transmitting a second certificate generated based on the first certificate with which the received certificate generation request token is corresponding to the service providing apparatus in response to a request of the second certificate by the certificate requesting means.

(2) In the certificate generating/distributing system in (1) above, the certificate transmitting means may transmit, to the service providing apparatus, a certificate generation request token, which is information corresponding to the second certificate, together with the second certificate and the service providing apparatus may include providing apparatus token forwarding means (e.g., realized by service access mediating means 50) for forwarding the certificate generation request token transmitted by the certificate transmitting means to another service providing apparatus. In the certificate generating/distributing system configured in this way, the service providing apparatus can make proxy access to a further service providing apparatus.

(3) In the certificate generating/distributing system in (1) above, the service mediating apparatus may include requesting means (e.g., realized by certificate distribution requesting means 51) for requesting the authentication apparatus for the first certificate, the requesting means may transmit information (e.g., realized by list information) indicating a predetermined service providing apparatus to the authentication apparatus when requesting the first certificate, and the certificate transmitting means may judge whether or not to transmit a second certificate based on the received information indicating the predetermined service providing apparatus. The certificate generating/distributing system configured in this way can transmit a certificate to a service providing apparatus specified by the service mediating apparatus.

(4) In the certificate generating/distributing system in (1) above, the authentication apparatus may include authentication apparatus token generating means for generating a certificate generation request token and the token transmitting means may transmit the certificate generation request token generated by the authentication apparatus token generating means to the service mediating apparatus. The certificate generating/distributing system configured in this way can use the certificate generation request token generated by the authentication apparatus.

(5) In the certificate generating/distributing system in (1) above, the service mediating apparatus may include mediating apparatus token generating means for generating a certificate generation request token and the token transmitting means may receive the certificate generation request token generated by the mediating apparatus token generating means and transmit the certificate generation request token corresponding to the first certificate to the service mediating apparatus. The certificate generating/distributing system configured in this way can use the certificate generation request token generated by the service mediating apparatus.

INDUSTRIAL APPLICABILITY

The present invention is applicable to services on the Internet, a certificate generating/distributing system in a distributed system constructed on a network such as intra-corporate system, inter-corporate system or carrier system, or a program for causing a computer to realize a certificate generating/distributing system or the like.

The present invention has been described with reference to the exemplary embodiments and examples so far, but the present invention is not limited to the above described exemplary embodiments and examples. Various modifications understandable to those skilled in the art may be made to the configuration and details of the present invention within the scope of the present invention.

This application is based upon and claims the benefit of priority from Japanese Patent Application No. 2007-247597 filed on Sep. 25, 2007, the content of which is incorporated by reference.

The invention claimed is:

1. A certificate generating/distributing system comprising:
an authentication apparatus that authenticates a user;
a service providing apparatus that provides a service; and
a service mediating apparatus that mediates service provision by the service providing apparatus,
wherein the authentication apparatus comprises a token transmitting section transmitting, to the service mediating apparatus, a first certificate generation request token, which is information corresponding to a first certificate valid in the service mediating apparatus, together with the first certificate,
the service mediating apparatus comprises a mediating apparatus token forwarding section forwarding the first certificate generation request token received from the token transmitting section to the service providing apparatus,
the service providing apparatus comprises a certificate requesting section transmitting the first certificate generation request token received from the mediating apparatus token forwarding section to the authentication apparatus when requesting a second certificate valid in the service providing apparatus, and
the authentication apparatus further comprises a certificate transmitting section transmitting the second certificate generated based on the first certificate corresponding to the received first certificate generation request token to the service providing apparatus in response to a request of the second certificate by the certificate requesting section,
wherein the service mediating apparatus comprises a requesting section requesting the authentication apparatus for the first certificate,
the requesting section transmits information indicating a predetermined service providing apparatus to the authentication apparatus when requesting the first certificate, and
the certificate transmitting section judges whether or not to transmit the second certificate based on the received information indicating the predetermined service providing apparatus.

2. The certificate generating/distributing system according to claim 1, wherein the certificate transmitting section transmits, to the service providing apparatus, a second certificate generation request token, which is information corresponding to the second certificate, together with the second certificate, and the service providing apparatus comprises a providing apparatus token forwarding section forwarding the second certificate generation request token transmitted by the certificate transmitting section to the other service providing apparatus.

3. The certificate generating/distributing system according to claim 1, wherein the authentication apparatus comprises an authentication apparatus token generating section generating the first certificate generation request token, and the token transmitting section transmits the first certificate generation request token generated by the authentication apparatus token generating section to the service mediating apparatus.

4. The certificate generating/distributing system according to claim 1, wherein the service mediating apparatus comprises a mediating apparatus token generating section generating the first certificate generation request token, and wherein the token transmitting section receives the first certificate generation request token generated by the mediating apparatus token generating section and transmits the first certificate generation request token corresponding to the first certificate to the service mediating apparatus.

5. An authentication apparatus that authenticates a user, comprising:

a token transmitting section transmitting, to a service mediating apparatus, a first certificate generation request token, which is information corresponding to a first certificate valid in the service mediating apparatus that mediates service provision by a service providing apparatus that provides a service, together with the first certificate; and a certificate transmitting section receiving a request for a second certificate valid in the service providing apparatus and the first certificate generation request token from the service providing apparatus and transmitting, to the service providing apparatus, the second certificate generated based on the first certificate corresponding to the received first certificate generation request token, wherein the certificate transmitting section receives information indicating a predetermined service providing apparatus from the service mediating apparatus and judges whether or not to transmit the second certificate based on the received information.

6. The authentication apparatus according to claim 5, wherein the certificate transmitting section transmits, to the service providing apparatus, a second certificate generation request token, which is information corresponding to the second certificate, together with the second certificate.

7. The authentication apparatus according to claim 5, wherein the authentication apparatus comprises authentication apparatus token generating section generating the first certificate generation request token, and the token transmitting section transmits the first certificate generation request token generated by the authentication apparatus token generating section to the service mediating apparatus.

8. The authentication apparatus according to claim 5, wherein the token transmitting section receives the first certificate generation request token generated by the service mediating apparatus and transmits, to the service mediating apparatus, the first certificate generation request token corresponding to the first certificate.

9. A service mediating apparatus that mediates service provision by a service providing apparatus that provides a service, comprising a mediating apparatus token forwarding section receiving a certificate generation request token, which is information corresponding to a first certificate valid in the service mediating apparatus, together with the first certificate, from an authentication apparatus that authenticates a user, and forwarding the certificate generation request token and the first certificate to the service providing apparatus that provides the service in response to access from the service mediating apparatus; and a requesting section requesting the authentication apparatus for the first certificate, wherein the requesting section transmits, to the authentication apparatus, information indicating a service providing apparatus in which the second certificate is valid when requesting the first certificate.

10. The service mediating apparatus according to claim 9, further comprising a mediating apparatus token generating section generating the certificate generation request token.

11. A service providing apparatus that provides a service, comprising:

a certificate requesting section receiving a first certificate generation request token, which is information related to a first certificate valid in a service mediating apparatus by an authentication apparatus from the service mediating apparatus that mediates service provision by the service providing apparatus, and transmitting, to the authentication apparatus, the first certificate generation request token when requesting a second certificate valid in the service providing apparatus; and a certificate receiving section receiving, from the authentication apparatus, the second certificate, which is a certificate transmitted by the authentication apparatus in response to the request for the second certificate by the certificate requesting section, the second certificate being generated based on the first certificate corresponding to the first certificate generation request token, wherein the certificate receiving section receives a second certificate generation request token which is information corresponding to the second certificate, together with the second certificate from the authentication apparatus, and the service providing apparatus further comprises providing an apparatus token forwarding section forwarding the second certificate generation request token received by the certificate receiving section to the other service providing apparatus.

12. A certificate generating/distributing method whereby an authentication apparatus that authenticates a user distributes a certificate to a service providing apparatus that provides a service and a service mediating apparatus that mediates service provision provided by the service providing apparatus, comprising:

the authentication apparatus including a token transmitting step of transmitting, to the service mediating apparatus, a first certificate generation request token, which is information corresponding to a first certificate valid in the service mediating apparatus, together with the first certificate;

the service mediating apparatus including a mediating apparatus token forwarding step of forwarding, to the service providing apparatus, the first certificate generation request token received, that has been transmitted in the token transmitting step;

the service providing apparatus including a certificate requesting step of transmitting, to the authentication apparatus, the first certificate generation request token received, that has been transmitted in the mediating apparatus token forwarding step, when requesting a second certificate valid in the service providing apparatus; and the authentication apparatus including a certificate transmitting step of transmitting, to the service providing apparatus, the second certificate generated based on the first certificate corresponding to the received first certificate generation request token, in response to the request of the second certificate in the certificate requesting step the service mediating apparatus further including a requesting step of requesting the authentication apparatus for the first certificate, in the requesting step, the service mediating apparatus transmits information indicating a predetermined service providing apparatus to the authentication apparatus when requesting the first certificate, and the authentication apparatus judges whether or not to transmit the second certificate based on the received information indicating the predetermined service providing apparatus, in the certificate transmitting step.

13. The certificate generating/distributing method according to claim 12, wherein the authentication apparatus transmits, in the certificate transmitting step, to the service providing apparatus, a second certificate generation request token, which is information corresponding to the second certificate, together with the second certificate; and the service providing apparatus further including a providing apparatus token forwarding step of forwarding the second certificate generation request token transmitted in the certificate transmitting step, to the other service providing apparatus.

14. The certificate generating/distributing method according to claim 12, wherein the authentication apparatus further including an authentication apparatus token generating step of generating the first certificate generation request token, the authentication apparatus transmits the first certificate generation request token generated in the authentication apparatus token generating step, to the service mediating apparatus in the token transmitting step.

15. The certificate generating/distributing method according to claim 12, wherein the service mediating apparatus further including a mediating apparatus token generating step of generating the first certificate generation request token, wherein the authentication apparatus receives the first certificate generation request token generated in the mediating apparatus token generating step and transmits, to the service mediating apparatus, the first certificate generation request token corresponding to the first certificate.

* * * * *